(12) United States Patent
Sriram et al.

(10) Patent No.: US 7,084,869 B2
(45) Date of Patent: *Aug. 1, 2006

(54) METHODS AND APPARATUS FOR DETECTING AND CORRECTING PENETRATION BETWEEN OBJECTS

(75) Inventors: Krishnan Sriram, Cambridge, MA (US); Sanjay E. Sarma, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 204 days.

This patent is subject to a terminal disclaimer.

(21) Appl. No.: 10/267,907

(22) Filed: Oct. 9, 2002

(65) Prior Publication Data

US 2003/0112281 A1    Jun. 19, 2003

Related U.S. Application Data

(63) Continuation-in-part of application No. 09/542,942, filed on Mar. 31, 2000.

(60) Provisional application No. 60/327,940, filed on Oct. 9, 2001.

(51) Int. Cl.
*G06T 15/00*    (2006.01)

(52) U.S. Cl. .................. 345/419; 345/958; 463/32

(58) Field of Classification Search ............... 345/156, 345/157, 162, 163, 419, 679, 420, 421, 422, 345/423, 958; 703/2; 715/848; 700/98; 463/52, 37, 32, 31; 711/203
See application file for complete search history.

(56) References Cited

U.S. PATENT DOCUMENTS

| | | | | |
|---|---|---|---|---|
| 5,488,700 A | * | 1/1996 | Glassner | 345/426 |
| 5,577,417 A | * | 11/1996 | Fournier | 74/523 |
| 5,675,720 A | * | 10/1997 | Sato et al. | 345/419 |
| 6,075,905 A | * | 6/2000 | Herman et al. | 382/284 |
| 6,128,086 A | * | 10/2000 | Fowler et al. | 356/616 |
| 6,151,027 A | * | 11/2000 | Yoo | 345/423 |
| 6,215,503 B1 | * | 4/2001 | Snyder et al. | 345/629 |
| 6,404,913 B1 | * | 6/2002 | Ohki | 382/154 |
| 6,421,048 B1 | * | 7/2002 | Shih et al. | 345/419 |

OTHER PUBLICATIONS

Paul Jerome Killpatrick, The use of Kinesthetic Supplement in an Interactive Graphic System, Feb. 17, 1977, University of North Carolina.*

Gregory, A. et al., "Six degree-of-freedom haptic display of polygonal models," Proceedings of the Conference on Visualization '00, 2000, pp. 139-146.

(Continued)

*Primary Examiner*—Richard Hjerpe
*Assistant Examiner*—Abbas Abdulselam
(74) *Attorney, Agent, or Firm*—Wolf, Greenfield & Sacks, P.C.

(57) ABSTRACT

A method of collision detection is provided that allows for virtual objects having arbitrary shapes to be simulated with six degrees of freedom. The collision detection method is capable of providing full body contact by detecting each intersection between a representation of a first virtual object and a representation of a second virtual object. The full-body contact may be provided as haptic rendering signals indicating the full-body contact between the two virtual objects.

77 Claims, 8 Drawing Sheets

OTHER PUBLICATIONS

Klosowski, J.T. et al., "Efficient collision detection using bounding volume hierarchies of κ-DOPs," IEEE Transactions on Visualization and Computer Graphics, vol. 4, No. 1, Jan. 1998-Mar. 1998, pp. 21-36.

Ponamgi, M. K. et al., "Incremental algorithms for collision detection between polygonal models," IEEE Transactions on Visualization and Computer Graphics, vol. 3, No. 1, Jan. 1997-Mar. 1997, pp. 51-64.

* cited by examiner

METHODS AND APPARATUS FOR DETECTING AND CORRECTING PENETRATION BETWEEN OBJECTS

RELATED APPLICATIONS

This application claims the benefit under 35 U.S.C. §119 (e) of U.S. Provisional Application No. 60/327,940 filed Oct. 9, 2001, entitled "METHOD AND APPARATUS FOR DETECTING AND CORRECTING PENETRATION BETWEEN TWO OBJECTS," by Krishnan Sriram, et al., and is a continuation-in-part of U.S. application Ser. No. 09/542,942, filed Mar. 31, 2000, entitled "HAPTIC INTERFACE SYSTEM FOR COLLISION DETECTION AND APPLICATION THEREFOR," by Ho, et al. The entirety of the aforementioned applications are hereby incorporated by reference.

FIELD OF THE INVENTION

This invention relates to the computation of the spatial relationship between two virtual objects having arbitrary shapes and, more particularly, to collision detection and the computation of full-body contact between the two objects.

BACKGROUND OF THE INVENTION

Determining proximity information and computing spatial relationships between virtual objects is a fundamental consideration in many areas of robotics, computer-aided design, computer graphics and virtual reality applications. As virtual objects have no real or physical existence, a virtual object is often characterized by a mathematical and/or geometric representation. As such, simulation of the interactions between virtual objects in a virtual environment is computational in nature.

Although a virtual object is not real, it may have a real counterpart, that is, the representation of the virtual object may describe or model a real object. For example, a robot navigating through a real environment may have an internal representation of that environment such as a mathematical description of itself, where each object is located and what space each object occupies in the environment. These mathematical descriptions of the objects in the internal representation of the environment, also referred to as models, must explain the physical environment with sufficient accuracy and detail and be responsive to changes in the real environment, such that the robot can navigate and perform the various tasks required of it in the physical environment. When a virtual object has an immediate real counterpart, the virtual object is sometimes referred to as an avatar.

In other examples, the virtual environment may not have a real or physical counterpart. In many video games, for example a flight simulator, the objects and environment in the simulation, though perhaps modeled to imitate real or physical objects and environments, have no immediate real counterpart.

The term "virtual object" or simply "object" refers to the representation of the object and not the real object itself. The terms "real" or "physical" will be used herein when describing objects having a physical existence. The acts involved in mathematically describing, or otherwise modeling virtual objects and environments is referred to generally as "representation."

Since virtual objects exist as mathematical concepts, the spatial relationships between the objects and forces arising from such relationships are computational constructs. Such computations may include updating the representation of each virtual object according to motion or movement (e.g., translation, rotation, and/or deformation of the object), detecting collisions and/or at-a-distance forces between virtual objects, determining a response to collision forces, etc. The acts involved in computing relationships and/or interactions between virtual objects in a virtual environment is referred to generally as "simulation." A simulation is often implemented as a computer program that is executed on one or more processors of a computer and/or computer system.

A simulation may be partially guided by input from a user, or otherwise externally instructed. For example, an interface device, such as a joystick, mouse, track ball, gimbal, etc., may be manipulated by a user to apply control signals to the simulation. For example, a user may manipulate a joystick to control the movement of a virtual object.

Typically, the effect of the user input or change enacted on a virtual object through the interface device is computed and rendered as feedback to the user. That is, a user may effect a change in one or more objects in a virtual environment, the representation of the environment may then be updated to reflect the change, interaction between objects caused by the user input detected and simulated, and the results reported back to the user. This type of feedback control loop is commonly used in virtual environments.

In some instances, a simulation is visually rendered to the user. That is, the virtual objects in an environment may be rendered to a display such that a user may observe the effects of his actions through the interface device. A simulation or portions of a simulation may also be haptically rendered. The term "haptic" refers to the sense of touch. As such, a haptic rendering refers to stimuli that is communicated through feel or touch sensations rather than through the more common use of visual stimuli. A virtual environment may employ both haptic and visual renderings of the events in a simulation.

Haptic sensations may be communicated, for example, as a force-feedback applied to the interface device manipulated by the user. In a haptic rendering, it may be important to communicate the sensation, for instance, of two virtual objects colliding, or the sensation of two objects that are in tactile contact with one another. As such, collision detection is often part of the computations involved in modifying a virtual environment in response to, for example, a user enacted movement, or in updating an environment to ensure that the proper state of the environment is being reported (i.e., updating an environment to ensure that feedback renderings accurately reflect the environment and the objects within the environment) to the user.

SUMMARY OF THE INVENTION

One embodiment according to the present invention includes a method of determining an extent of an intersection of a first object and a second object. The method comprises act of constructing a first representation of the first object and a second representation of the second object, the second representation defining at least a surface of the second object, determining at least an original Voronoi diagram of the second representation, detecting at least one intersection between the first representation and the second representation, and determining a distance from the at least one point of intersection to the surface of the second object based on a location of the at least one point of intersection within the original Voronoi diagram.

Another embodiment according to the present invention includes a method of simulating an interaction between a controlled object and an independent object with six degrees of freedom in a virtual environment including a haptic interface device having a controlled portion moveable with six degrees of freedom. The method comprising acts of receiving control signals from the interface device, the control signals including pose information with six degrees of freedom, updating a first representation of the controlled object according to the pose information, determining a presence or an absence of intersection between the first representation of the controlled object and a second representation of the independent object, and computing at least one rendering signal related to the presence or absence of intersection between the first representation and the second representation.

Another embodiment according to the present invention includes a method in a virtual environment of providing full-body contact between a first object and a second object. The method comprising acts of representing a first object by a first representation including a first set of primitives and a second object by a second representation including a second set of primitives, detecting a presence or an absence of an intersection between each of the first set of primitives and the second set of primitives, determining a penetration vector for each present intersection, determining a penetration vector for each present intersection, and computing at least one synthesized vector from the at least one penetration vector, the at least one synthesized vector having at least one translational force component and at least one rotational force component.

Another embodiment according to the present invention includes a computer readable medium encoded with a program for execution on at least one processor, the program, when executed on the at least one processor, performing method of determining an extent of an intersection between a first object and a second object. The method comprises acts of constructing a first representation of the first object and a second representation of the second object, the second representation defining at least a surface of the second object, determining at least an original Voronoi diagram of the second representation, detecting at least one intersection between the first representation and the second representation, and determining a distance from the at least one point of intersection to the surface of the second object based on a location of the at least one point of intersection within the original Voronoi diagram.

Another embodiment according to the present invention includes a computer readable medium encoded with a program for execution on at least one processor, the program, when executed on the at least one processor, performing, in a virtual environment including a haptic interface device having a controlled portion moveable with six degrees of freedom, a method of simulating an interaction between a controlled object and an independent object with six degrees of freedom. The method comprises acts of receiving control signals from the interface device, the control signals including pose information with six degrees of freedom, updating a first representation of the controlled object according to the pose information, determining a presence or an absence of intersection between the first representation of the controlled object and a second representation of the independent object, and computing at least one rendering signal related to the presence or absence of intersection between the first representation and the second representation.

Another embodiment according to the present invention includes a computer readable medium encoded with a program for execution on at least one processor, the program, when executed on the at least one processor, performing a method of providing full-body contact between a first object and a second object. The method comprises acts of representing a first object by a first representation including a first set of primitives and a second object by a second representation including a second set of primitives, detecting a presence or an absence of an intersection between each of the first set of primitives and the second set of primitives, determining a penetration vector for each present intersection, and computing at least one synthesized vector from the at least one penetration vector, the at least one synthesized vector having at least one translational force component and at least one rotational force component.

DETAILED DESCRIPTION

Many applications in the areas of robotics, virtual reality and haptic feedback systems, impose a real-time or near real-time constraint on the performance of the simulation. To meet this real-time constraint, a simulation often has stringent time requirements for computation such that the efficiency of a simulation method is an important consideration. Conventional methods for simulation have relied upon assumptions about an object's shape that ultimately render the proposed methods undesirable or unusable as a general solution. For example, assumptions about the shape of the virtual objects, such as limiting an object to convex shapes, have severely restricted the types of applications that can utilize such methods. Other assumptions about an object's shape, such as symmetry and continuity have further prevented conventional methods from solving the problem of simulating virtual objects of arbitrary shape.

In particular, systems that employ rendering as part of a control feedback loop may be vulnerable to loss of synchronization should the simulation fail to observe real-time constraints when computing and generating feedback signals. This loss of synchronized cause and effect can be very disorienting to a user, and may cause the user to make certain erroneous and/or unintentional actions. This may be particularly deleterious in cases where the virtual environment has an immediate physical counterpart. As such, the computational complexity of a simulation is considered closely in order to ensure that real-time constraints are met.

Figure 1:
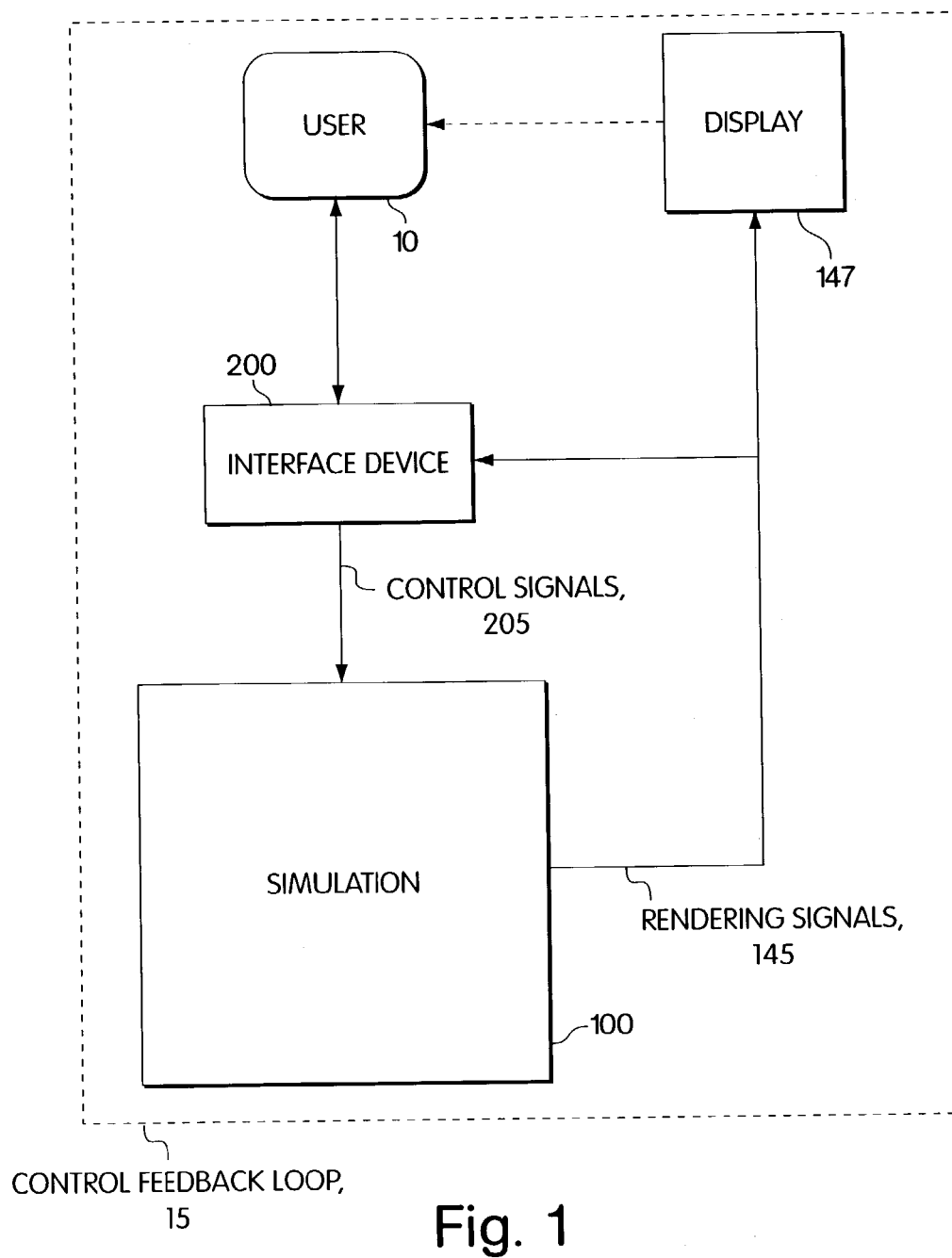
FIG. 1 illustrates a block diagram of a control feedback loop.

FIG. 1 illustrates a control feedback loop that may be employed in virtual reality applications. The control feedback loop allows a user or operator to provide input to a simulation to effect change in a virtual environment and to receive back from the simulation the results of such an action. The components of control feedback loop 15 include a user 10, an interface device 200, and simulation 100.

User 10 is often a human operator or participant in the virtual environment. In order to participate in the virtual environment, the user may control some portion of the virtual environment via interface device 200. Typically, the user manipulates a moveable portion of interface device 200, for example, the handle of a joystick in order to direct the movement of one or more controlled objects. The term "controlled object" or "controlled portion" refers to a virtual object or a portion of a virtual environment that is under direct control of a user or otherwise directly controlled external to the simulation. Interface device 200 may include sensors, electromechanical structures, or any of other various means for tracking the user's motions and translating the motions into control signals 205. Control signals 205 are provided to simulation 100 as instructions on how the controlled portion and/or controlled objects of the virtual environment should be modified and/or updated.

The changes in the virtual environment effected by control signals 205 generated by the movements of user 10 may cause the virtual objects in the environment to interact.

For instance, the actions of the user may bring the controlled portion of the environment into contact with other portions and/or objects in the environment. As such, the simulation may compute these interactions and report the results back to the user. The acts involved in reporting results of a simulation back to the user are referred to as rendering. Visual and auditory renderings have long been used to notify a user about the state of a virtual environment. Haptic rendering is now recognized by the virtual reality community and others as a valuable method of articulating information about a virtual environment where visual and/or auditory information is insufficient, where tactile information may provide a more complete understanding of a virtual environment, or to supplement other rendering modes to further enhance a virtual experience.

A control feedback loop will often exploit more than one rendering technique in order to provide comprehensive information about an environment. In order to communicate this information to the user, simulation 100 computes rendering signals 145 and provides them to the user as stimuli so that the user can interpret and comprehend the virtual environment. For example, a simulation may visually render the environment to a display 147 that the user can view, may haptically render the results of the interaction to the interface device to articulate feel sensations to the user, or both. The control loop may include other types of rendering modes, for example, auditory rendering signals.

As noted above, if the feedback loop is not maintained in real time, the virtual environment becomes confusing and may lead to misinterpretation of the environment or to more deleterious effects such as loss of control by the user. As observed by Applicant, most virtual reality simulations are computationally expensive. As such, conventional simulation methods have relied upon certain assumptions about the virtual environment in order to meet the real time constraints of the application.

For example, conventional simulations may rely upon various assumptions about the shape of a virtual object. For instance, conventional virtual objects may be limited to convex shapes. In addition, assumptions about shape symmetry, continuity, and complexity are often relied upon in order to reduce the computational requirements of simulating virtual objects. As a result, such conventional methods are not generic, that is, they do not support arbitrary shapes. However, considering the numerous and varied engineering, scientific, and entertainment applications that involve, for instance, non-convex shapes, limiting the shape of an object is often a prohibitive restriction.

An important and often times computationally complex component of a simulation is collision detection. Collision detection refers generally to computation involved in determining the spatial relationship between two or more virtual objects so as to determine whether two or more objects have or will come into contact with one another. In haptic simulations, contact between objects often must be computed on the order of 1000 Hz or higher. As such, the expense of such computations may determine whether a real-time constraint is met.

One embodiment according to the present invention includes a method of collision detection supporting arbitrary shapes, specifically, a method independent of the convexity and/or symmetry of the virtual objects being simulated.

Many conventional simulations have reduced computational complexity by limiting collision detection to point contact computations. Point contact refers to collision detection methods wherein only a single point, a small group of points, or a simplified region is tested for collision and/or contact. Stated differently, in point contact simulations, a virtual object may have a designated active region (often a single point) in which collisions are considered and contact forces computed. Collisions occurring elsewhere on the body of the object are ignored, that is, they are not computed. Point-contact methods allow for the number of collision computations to be greatly reduced, often times to a single intersection and force calculation.

However, point contact collision detection may not provide adequate information about interactions between two objects. For example, in haptic rendering simulations, point contact force feedback may not feel authentic and may be inappropriate for applications that require more realistic and comprehensive feel sensations. For instance, in remote surgery applications point contact information may not be able to articulate the complex and subtle sensations required by a surgeon to properly negotiate and comprehend the virtual environment with, for instance, a virtual scalpel or probe.

In various CAD/CAM applications described in U.S. patent application Ser. No. 09/542,942, which is hereby incorporated by reference in its entirety, a virtual object representing a milling tool is controlled by a haptic interface device to remove portions of a surface to be milled. The force applied to the tool may effect how much material is removed from the surface, the depth of a cut, the torque on the tool, etc. As such, it may be important that contact computations report back realistic and accurate haptic information such that the operator is aware of how much pressure is being applied, and what part of the tool is in contact with the milling surface. Point contact information may not report back forces that arise everywhere on the body of a virtual object and may be too limited to describe higher order forces such as torque, shear, etc.

In applications where a virtual object has an immediate physical counter part, point-contact algorithms may completely overlook actual interactions between objects. In the example of the robot navigating a real environment, unless the entire representation of the robot is considered in the simulation, the robot may experience accidental collisions with the real environment because the simulation provides only limited contact information. In the milling application referenced above, it may be important to consider any and all contact made between the tool and the milling surface to ensure that cutting surfaces of the tool do not contact and remove portions of the milling surface without such a contact being reported to the operator through the haptic interface device.

Accordingly, another embodiment of the present invention includes a method of providing full-body contact collision detection and force calculation. Full-body contact refers generally to collision detection in which each part or portion of a virtual object is considered when determining if collision and/or contact has occurred.

A simulation is often divided logically into three interrelated categories; representation, interaction, and rendering. The methods applied to each category and how they interrelate may impact how general a simulation may be and how complex and expensive the computation.

For instance, conventional simulations often reduce the computational complexity by reducing the number of degrees of freedom with which objects in a virtual environment are simulated. The number of degrees of freedom refers to the number of dimensions for which an object is permitted to arbitrarily vary, and is typically related to the number of variable parameters that describe the pose of an object. The "pose" of an object refers to the set of parameters required to describe an object's location in space and, more particularly, the parameters sufficient to locate an object such that the space or portion of the space an object occupies may be computed from its representation.

As an example, a rigid body may be located in a three dimensional (3-D) space defined by a standard Cartesian coordinate system by six parameters, specifically, by its deviation from the origin of the coordinate system along each of the three axes (e.g., the X, Y, and Z axes) of the coordinate system. In particular, for an object to be located such that the space or a portion of the space it occupies can be computed, the translational deviation from and the rotational deviation about each axis of the coordinate system needs to be specified. Hence, an object simulated with six degrees of freedom would permit all six pose parameters to vary arbitrarily.

The interface device in a control feedback loop may limit the number of parameters that are allowed to be controlled by the user. For example, a virtual object may be simulated with six degrees of freedom while the interface device is limited to some reduced number of degrees of freedom. For example, consider any of the numerous driving and/or race car video games, or car simulations controlled by a steering wheel. The user may only have direct control over one dimension (i.e., the rotation of the axle of the car), that is, the control signals from the interface device will only contain information related to rotational deviation of the axle about the axis of the car. However, this information may be received by a simulation to determine the location of the representation of the virtual car with six degrees of freedom.

For example, the input from the user (i.e., one dimensional information regarding the rotation of the axle) may be used in conjunction with velocity information to compute the car's position on the surface that the car is being driven. Additionally, this new position may lead the car up a ramp or send the car into collision with other objects. These actions may result in the virtual car being simulated in a jump, flip or roll wherein the representation of the car varies with six degrees of freedom. However, the interface device itself only provides the simulation with control signals having a variable component in a single dimension, that is, the interface device operates with one of freedom.

In other conventional control feedback loops, the simulation is computed with fewer degrees of freedom than provided by the interface device. Consider, for example, the classic video game Pong in which the "paddle" was only free to move in one direction. Since the paddle was constrained in all other directions, the paddle could be located simply by tracking its deviation along a single axis. The paddle in pong was simulated with one degree of freedom. However, the paddle in Pong was often controlled by a joystick or trackball capable of providing control signals with more than one degree of freedom. In such a situation, the simulation simply ignores the control signals relating to movement in the unused dimension or dimensions, that is, the dimensions constrained by the simulation.

Moreover, some simulations exploit assumptions about the virtual objects or about the nature of the simulation in order to reduce the number of parameters required to locate an object, thereby reducing the computational complexity of the simulation. For example, assuming that an object is axially symmetric allows rotation about the z-axis to be disregarded since the space occupied by an axially symmetric object will be identical for all rotations about the axis of symmetry. Other assumptions about the simulation may also reduce the dimensionality of locating an object.

However, constraining more than three degrees in either the interface device or the simulation is generally not acceptable in a virtual environment. It is desirable to have a virtual environment wherein the interface device and the simulation both operate with six degrees of freedom. Recent developments in virtual technology have produced interface devices capable of operating with six degrees of freedom.

Applicants have developed and implemented a simulation for use with an interface device capable of providing control signals having variable components in six dimensions, that is, the interface device and the simulation are capable of operating with six degrees of freedom. According to one embodiment of the present invention, the simulation operates without compromising the real-time constraint.

Figure 2:
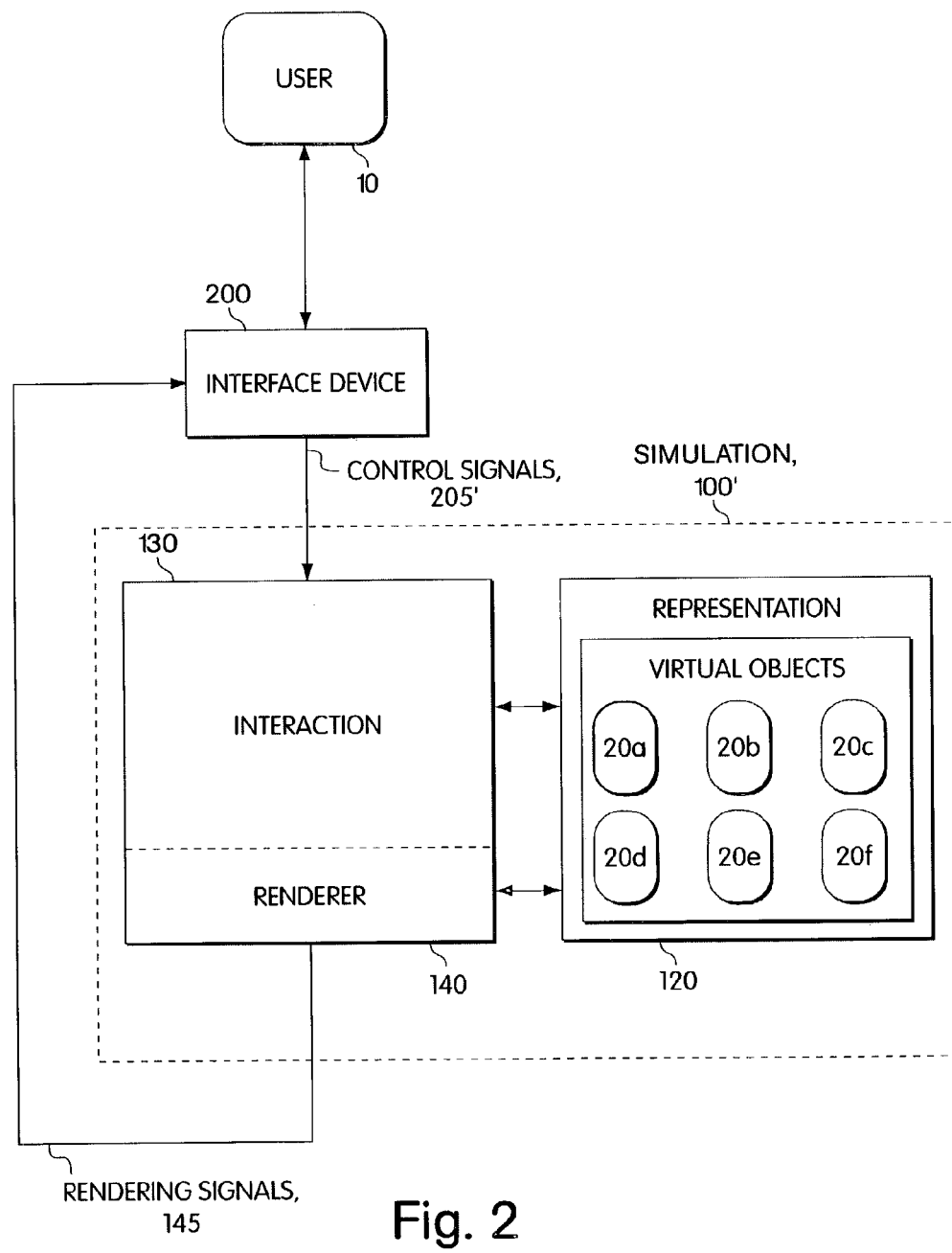
FIG. 2 illustrates a simulation according to the one embodiment of the present invention.

FIG. 2 illustrates an embodiment of a simulation according to the present invention. Simulation 100' includes representation 120, interaction 130, and renderer 140. Representation 120 includes a model of the virtual environment and, more particularly, the mathematical and/or geometric description of the objects in the environment. For example, the virtual environment is illustrated as including six virtual objects 20a–20f, at least one of which is controlled by the interface device. The choice of representation may impact the type of shapes that can be modeled and may influence the computational complexity, and ultimately the speed and robustness of the simulation.

Virtual objects in an environment may be modeled in a variety of different ways, that is, there are numerous and varied representations of an object. Representations include implicit equations, algebraic and parametric representations, splines, etc. Each representation may have characteristics that benefit a particular application. For instance, implicit representations have well defined algebraic equations making them well suited for fast collision detection due to simple and rapid intersection tests. However, the use of an implicit representation may prevent the simulation from processing arbitrary shapes. That is, the shape of the object typically must be known a priori in order to generate an implicit representation of the object.

Another method of object representation includes modeling an object as a set of primitives. The term "primitive" describes any geometric element used as a basis for constructing a shape or object. For example, typical primitives include, but are not limited to, points, lines, polygons, etc. Accordingly, a virtual object may be represented as a point cloud, polygon soup, polygonal surface or mesh, etc. Such primitive-based approaches often describe an object by defining the outer boundary of the object, referred to as a surface representation. For example, objects 20a–20f may be represented as a set of interconnected polygons on the surface of the virtual object, often referred to as a polygonal surface or mesh.

In a polygonal surface the individual polygons constituting the surface are referred to as facets. In a closed polygonal surface, each facet will share an edge with at least one other facet. The simplest polygonal surface comprises triangular facets and is referred to as a triangulated surface or, alternatively, a triangulated mesh.

In FIG. 2, object 20a is illustrated in bold to indicate that it is a controlled object manipulated by the user via interface device 200. The movement of object 20a may be computed according to the information provided by control signals 205'. As such, the pose of the virtual object 20a is updated such that it is consistent with the input from the interface device.

For example, a user manipulates the interface device in order to direct the movements of object 20a. The control signals generated by the interface device are provided to the simulation and the pose of object 20a is updated. In one aspect of the invention, the controls signals include variable components in six dimensions and the pose of object 20a is updated according to each of the six dimensions, that is, object 20a is simulated with six degrees of freedom. The updated pose of object 20a may cause an interaction with one or more of the other objects in the virtual environment. As such, interaction 130 may compute the spatial relationship between the objects in the virtual environment in view of the updated pose of object 20a. In particular, interaction 130 may perform collision detection between object 20a and the other objects in the virtual environment (e.g., objects 20b–20g).

It should be appreciated that collisions in a virtual environment are mathematical concepts in that virtual objects have no real physical structure with which to collide or create contact. As such, one method of detecting collisions between two virtual objects is to intersect the representations of the virtual objects. The term "intersection" refers to the computations involved in determining whether the representations of two virtual objects occupy space in common. However, in order to make this determination, the space or a portion of the space that each virtual object occupies must be determined.

In surface representations (e.g., a triangulated surface representation), in contrast to implicit representations, information regarding points on the interior and on the exterior of an object are not readily available. Because only the surface of the object is defined by the representation, extensive computation may be involved in determining whether an arbitrary point lies on the interior or exterior of the object's surface. As such, in a simulation that supports arbitrary shapes, computation to determine which points lie on the interior of a surface representation are arbitrarily complex and may compromise real-time performance.

Conventional virtual environments have avoided this computational expense in a number of ways, including restricting the shape and complexity of the objects that are allowed to be represented, providing only point contact collision detection, etc. As noted above, point contact collision detection may not provide sufficient information in a control feedback loop, particularly in haptic rendering environments. Moreover, point contact collision algorithms, in general, cannot be considered as supporting arbitrary shapes in that some or much of the shape is ignored during collision detection.

Applicant has appreciated that computing object interactions for realistic renderings may benefit from full-body contact. Full-body contact refers to computing collisions and/or contacts between two virtual objects wherein the entire representation of the object is considered. That is, full-body intersection is computed and contact forces related to the full-body intersection are then determined.

Applicant has developed and implemented a method of collision detection between virtual objects that supports arbitrary shapes and provides full-body contact. One embodiment according to the present invention includes constructing a bounding hierarchy for objects considered for collision detection in a simulation. A bounding element hierarchy is a structure that encloses a core representation of a virtual object using a simpler representation and/or a fewer number of primitives. The term "core representation" generally refers to the representation of an object that is the least approximate of the underlying shape, that is, the representation having the finest level of resolution.

In the following description, the term element is used synonymously with primitive. In particular, an element may be a primitive or a collection of primitives. In general, the term element will be used in reference to bounding hierarchies and primitives for core representations for clarity when describing the two types of representations in relation to one another. However, the two terms do not refer to fundamentally different things.

In bounding element hierarchies, bounding elements are often computationally simpler than the core representation in that they may have known orientations and comprise primitives having known relationships to one another. A bounding element hierarchy forms a progressively refined representation of the virtual object that may be traversed as a binary tree, thus employing the principles and enjoying the complexity reduction of a binary search.

A bounding element hierarchy is a multi-resolution object representation. The root level of the hierarchy is typically at the coarsest resolution, that is, the root level is the most imprecise approximation to the underlying shape of an object. At the leaf level of the hierarchy the representation is at its highest resolution, that is, it most closely approximates the underlying shape of the object. Typically, the underlying shape of an object has a core representation and the bounding hierarchy is built around this core representation and progressively refined down the hierarchy from root to leaf.

Many of the concepts and principles discussed herein are illustrated in two dimensions in the drawings for clarity of presentation. However, virtual environments are typically considered in three dimensions and, while applicable to problems in two dimensions, the advantages of methods and apparatus of the present invention are more readily exploited in three dimensions where computational complexity may become prohibitive. Applicants have developed and implemented the concepts described herein in methods involving three dimensional simulations. As such, the two dimensional depictions in the drawings do not in anyway limit the scope of the invention.

Figure 3:
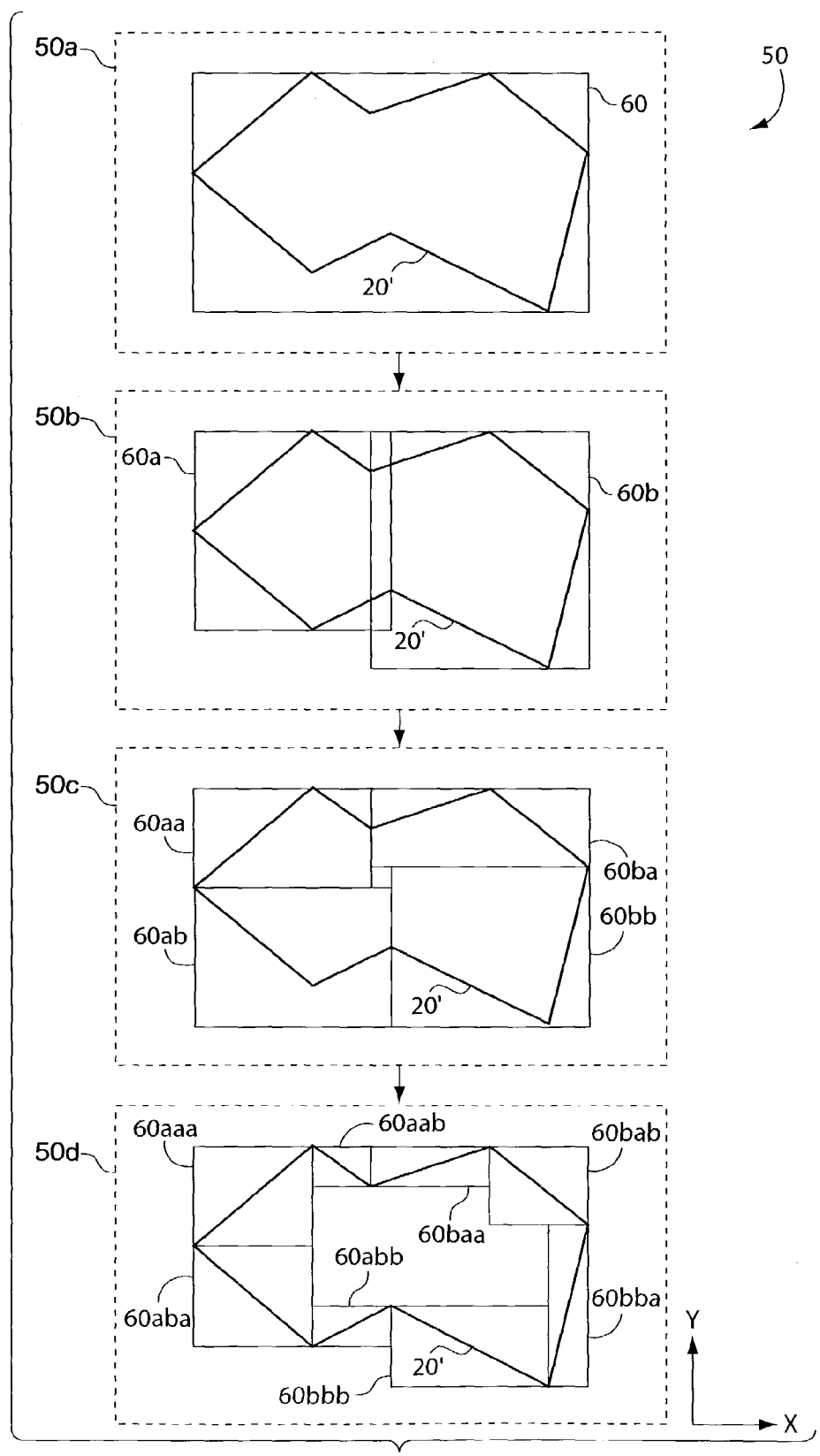
FIG. 3 illustrates a block diagram of a bounding volume hierarchy.

FIG. 3 illustrates a two-dimensional example of a bounding element hierarchy for an object 20'. Object 20' may be represented, for instance, as a series of connected lines. Boundary hierarchy 50 illustrates four levels 50a–50d of a progressively refined bounding element hierarchy of object 20'.

At the root level 50a of the hierarchy, object 20' is enclosed in a single rectangle (bounding element). As shown, the bounding rectangle 60 completely encloses all eight lines of the core representation of object 20'. The space occupied by the bounding element is a superset of the one or more primitives it encloses. At the second level 50b of hierarchy 50, two bounding rectangles are used to enclose object 20'. As such, each bounding rectangle need only enclose a subset, for example, half of the lines comprising object 20'. Thus, the bounding hierarchy at the second level approximates the core representation more accurately than at the root level. Similarly, at level 50c of the bounding element hierarchy, the representation has been further refined such that each rectangle encompasses only two lines of shape 20'.

At the leaf level 50d of the hierarchy, the bounding representation has been refined such that each bounding rectangle encloses a single primitive (e.g., a line) of the core representation. The hierarchy in FIG. 3 is organized as a binary tree. The root level comprises a single element 60. Element 60 has two children, specifically, element 60a and 60b at the second level of the hierarchy. Likewise, at the next level element 60a has two children 60aa and 60ab and element 60b has two children 60ba and 60bb. The structure is similarly refined in such a manner until the leaf level is reached (i.e., a bounding element encloses a single primitive).

The leaf level of the hierarchy is the best approximation available to bounding hierarchy 50. However, other types of bounding elements may be used in a bounding element hierarchy such that the approximation may be more accurate. There are numerous methods of constructing bounding element hierarchies, including convex hulls, alpha shapes, axis-aligned bounding boxes (AABBs), oriented bounding boxes (OBBs), k-discrete orientation polytops (k-DOPs), etc.

For example, the bounding elements in hierarchy 50 are Axis Aligned Bounding Boxes (AABBs). The possible orientations of AABBs are constrained such that they align with one of the axes of the Cartesian space of the environment being modeled. For example, each line forming part of a bounding element in hierarchy 50 either aligns with the x-axis or the y-axis. In a k-DOP, a bounding hierarchy is formed wherein the bounding elements are allowed orientations in k different directions. This allows a bounding element to more closely approximate the core representation but still retain computational simplicity by having a known number of possible orientations (i.e., k possible orientations).

In a three dimensional space, the elements of a boundary hierarchy form volumes that enclose primitives of the core representation and are often referred to as bounding volume hierarchies. As in the two-dimensional case, the bounding volume hierarchy approach allows a core representation to be approximated using fewer primitives and, typically, simpler shapes.

Figure 4:
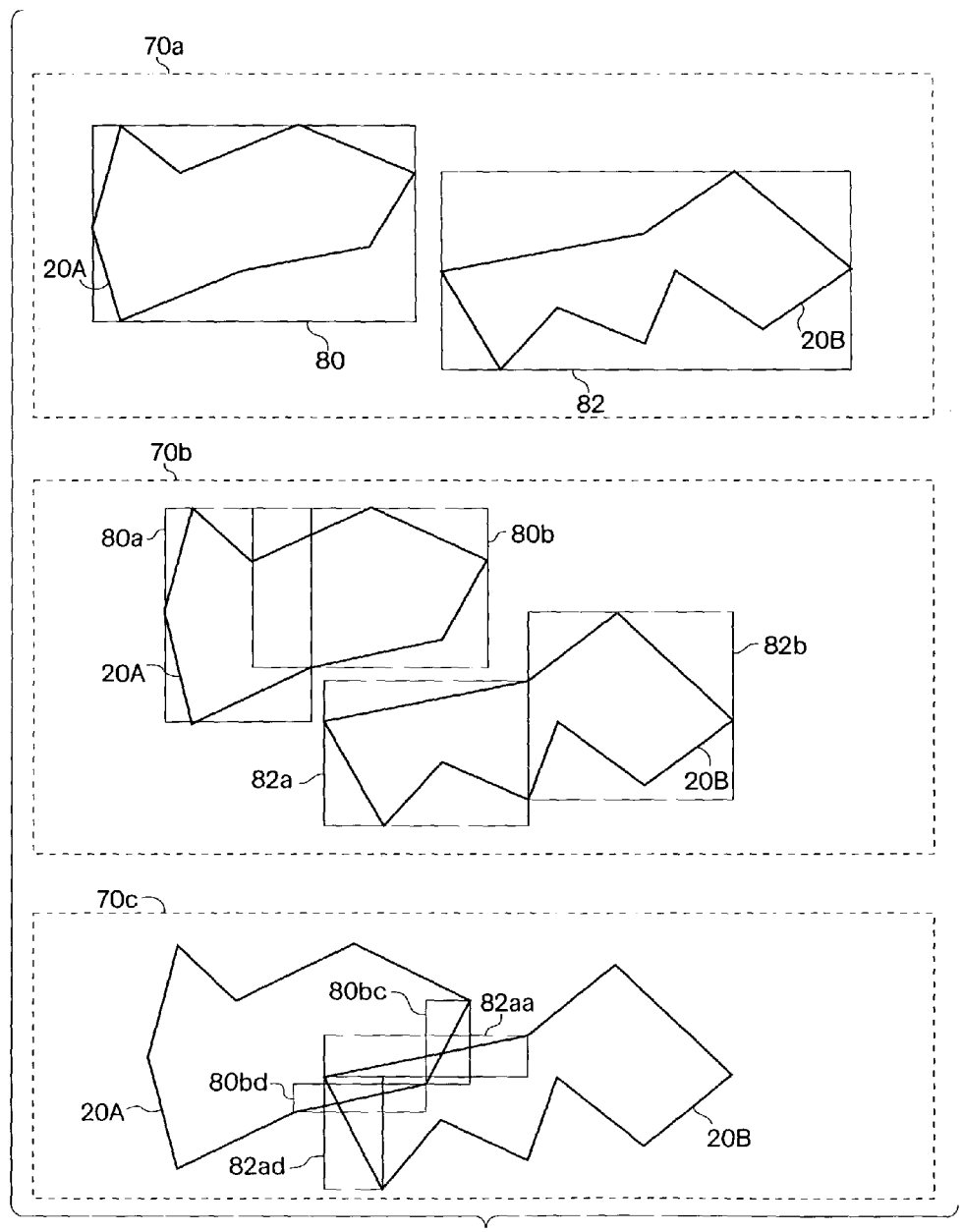
FIG. 4 illustrates a several spatial relationships between virtual objects that may arise during simulations according to one embodiment of the present invention.

FIG. 4 illustrates a method of traversing a bounding element hierarchy by considering three different spatial relationships between an a pair of objects. Spatial relationships 70a–70c illustrate three arrangements that may occur between two objects 20A and 20B during a simulation. Each spatial relationship is illustrated along with the level of the hierarchy that must be traversed in order to determined if the objects intersect.

For example, in spatial relationship 70a, the objects do not intersect. Since the objects will not intersect if their bounding elements do not intersect, the single computation of intersecting the root level bounding elements 80 and 82 is sufficient to determine that the objects do not intersect.

In spatial relationship 70b, the objects again do not intersect. However, because the root level bounding elements 80 and 82 are a coarse approximation to the core representation, the root levels of the hierarchies in fact intersect. As such, the next level of the hierarchy may need to be tested to determine if the objects intersect. The second level of the hierarchy enclosing primitives of object 20A includes bounding elements 80a and 80b. Similarly, the hierarchy enclosing primitives of object 20B includes bounding elements 82a and 82b. In spatial relationship 70b, it is sufficient to test the second level of the hierarchies for intersection to establish that the objects are non-intersecting.

It should be appreciated that at a given level of the hierarchy, if a bounding element is found to be non-intersecting, each of its descendents will also be nonintersecting. As such, the tree beneath a non-intersecting bounding element can be ignored.

In spatial relationship 70c, the core representations intersect, that is, the virtual objects have intersected one another. Because an intersection occurs at the finest resolution available (i.e., the core representation), at least one path from the root of the hierarchy to one or more leaves of the hierarchy will be traversed. In spatial relationship 70c, a bounding element encloses a single primitive of the core representation. For clarity, only the leaf level bounding elements detected as intersecting are depicted. As shown, two leaves of the bounding element hierarchy of object 20A are found to be intersecting two respective leaves of the bounding element hierarchy of object 20B, namely, element 80bd intersects element 82ad and element 80bc intersects element 82aa.

Traversal of a bounding hierarchy either terminates when all intersection tests at a given level of the hierarchy are false or completes when each bounding element in the leaf level of the hierarchies has been tested for intersection. If one or more of the leaf level bounding elements intersect, then at least some portion of the core representations may intersect.

It should be appreciated that the leaf level of a bounding volume hierarchy need not enclose a single primitive of the core representation. The resolution required by the leaf level may be chosen to satisfy the requirements of a particular implementation. Furthermore, a bounding element hierarchy may be structured ways other than a binary tree. For example, each bounding element at a level of the hierarchy may give rise to more than two children.

As noted previously, the interior of a surface representation is not easily obtained when the representation of an object is allowed to be arbitrarily complex. For example, if the number of primitives in a core representation is allowed to be arbitrarily large, the computation involved in determining if a point lies on the interior of the object may compromise real-time performance. However, since a bounding element is typically simpler and has fewer primitives than the core representation, the interior of a bounding element is often known or easily obtained. As such, a bounding element may inherently define part of the interior of the core representation by being a superset of the space occupied by the one or more primitives it encloses. For example, in relationship 70a of FIG. 4, the root level bounding element defines the entire interior of the object. Since, the interior of the bounding element is trivially obtained, so is the interior of the object.

However, at progressive levels of the hierarchy less of the interior of the object is mutually defined by the bounding elements. As shown in the leaf level of hierarchy 50 in FIG. 3, there is a region in the interior of object 20' that is not defined by the bounding elements. At levels in the hierarchy near the leaves, the bounding element very closely approximates the core representation. As a bounding element approximates the underlying representation arbitrarily close, the interior of the object defined by the bounding element approaches zero. Stated differently, the closer the bounding volume approximates the surface of an object, the less information is known about the object in directions normal to the surface of the object, that is, there is a loss of depth information.

Figure 5A:
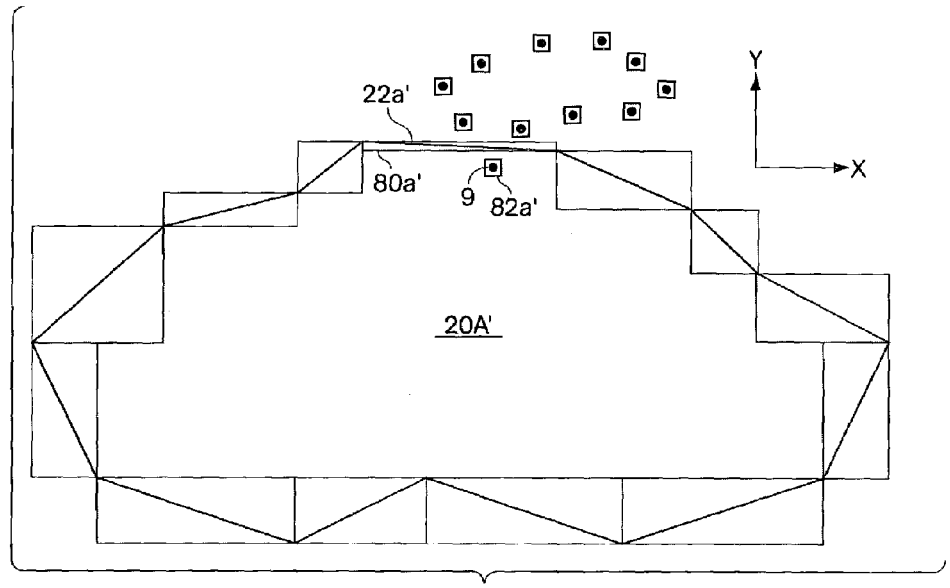
FIG. 5A illustrates a false-negative intersection condition that may arise from loss of depth information.

This loss of depth information may cause an intersection computation to incorrectly determine that two primitives, for instance, leaves of two bounding volume hierarchies do not intersect when in fact they do. FIG. 5A illustrates such a problem that may arise from loss of depth information. FIG. 5A illustrates a first object 20A' having an associated bounding element hierarchy. The leaf level representation of the associated bounding element hierarchy is shown. In this example, the bounding elements are AABB. A second object 20B' has a point cloud core representation and an associated bounding element hierarchy of which the leaf level is shown.

In the spatial relationship illustrated in FIG. 5A, point 9 is enclosed by bounding element 82a'. Point 9 is an intersecting point, that is, it lies on the interior of object 20A'. However, primitive 22a' of the representation of object 20A' is near axis-aligned and therefore the leaf level bounding element which is axis-aligned very closely approximates line 22a'. As such, the bounding element 80a' provides only minimal depth information regarding the interior of the object in a direction normal to line 22a'. In the degenerate case where the line is exactly axis-aligned, all depth information is lost. As such, the intersection test between leaf level bounding element 80a' of object A and leaf level bounding element 82a' of object B fails and the objects are erroneously determined to be non-intersecting.

Applicants have developed a method of adding depth information into the bounding representation to avoid false-negative intersection detection cases as illustrated in FIG. 5A. Applicants employ an offset surface in order to incorporate depth information about the interior of an object. The offset surface insures that at least a desired region of the interior of a surface representation in directions normal to the surface will be defined by the associated bounding element hierarchy.

An offset surface is described as the locus of points at a signed distance from a progenitor surface along surface normals of the progenitor surface. While surface normals for continuous representations such as algebraic or parametric functions are well understood, surface normals for discrete surfaces may be more complicated to compute and may only be approximate. For example, normals to a triangulated surface may be computed in more than one way. For instance, surface normals may be defined at the vertices of the triangles by "averaging" the planar normals of the facets that share the vertices. One such averaging method includes computing a localized quadratic surface approximation at each vertex, and taking the normal to the quadratic surface at the vertex.

Another method includes offsetting the planes along the normal to each facet of a polygonal surface, for instance, a triangulated surface. The original surface representation is referred to as the progenitor surface. The offset surface may be calculated, for example, by calculating the normal to each facet of a polygonal surface and defining a new plane at some desired distance (i.e., the desired extent of depth information) along the normal. The offset planes may then be intersected to establish the facets of the offset surface.

Figure 5B:
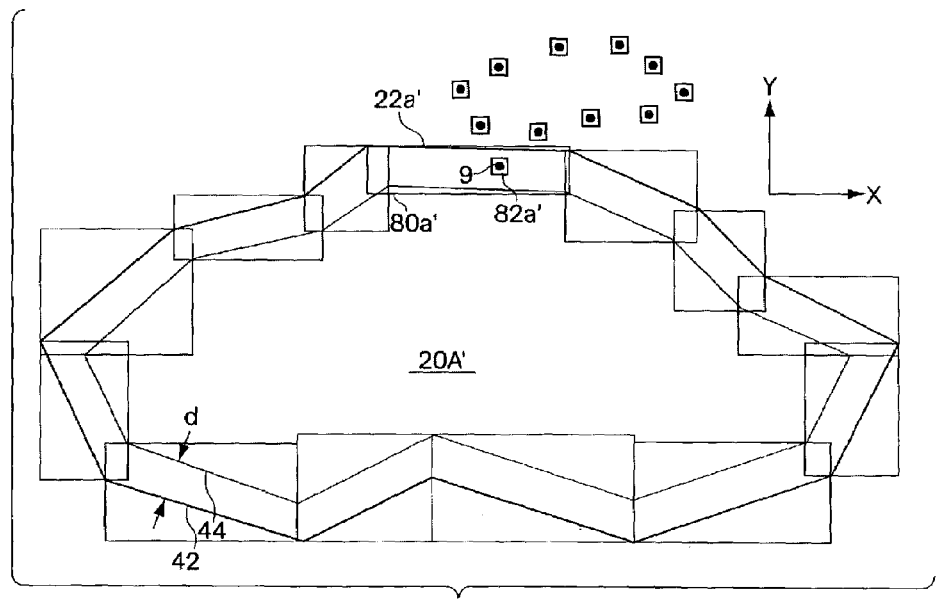
FIG. 5B illustrates a solution to the false-negative intersection condition according to one embodiment of the present invention.

FIG. 5B illustrates an object wherein an offset surface has been computed by using this approach. As shown in FIG. 5B, an offset surface 44 is shown at an offset distance d from progenitor surface 42 along the normal to each line of the representation of object 20A. An associated bounding element hierarchy may then be constructed such that the bounding elements enclose the progenitor and offset surfaces, thus retaining depth information related to the extent of the offset. That is, the leaf level bounding elements carry information about the interior of object 20A' to the extent of the offset distance d. The distance d may then be chosen to satisfy the requirements of a particular implementation. As such, the depth information prevents point 9 from being mischaracterized during intersection detection. The bounding element enclosing point 9 is now within bounding element 22a" and will therefore test positive as an intersecting point.

Consider a bounding volume hierarchy wherein bounding elements at the leaf level of the hierarchy enclose a single primitive of the core representations of virtual objects being intersected. It should be appreciated that a completed or terminated traversal of the hierarchy determines the presence or absence of an intersection between each primitive of the virtual objects. That is, full-body intersection has been computed. From this full-body intersection it may be desirable to compute a full-body contact from the full-body intersection, that is, the extent of each intersection is calculated to determine characteristics of the contact. Typically, when full-body contact is desired, the forces related to a full-body intersection are computed and often synthesized into at least one synthesized vector describing the contact between virtual objects.

In order to provide rendering signals with six degrees of freedom, a synthesized vector may include components describing the translation force and the rotational force on the virtual objects resulting from the full-body contact. For example, a synthesized vector may include three components describing the translation force on a virtual object and three components describing the moment or torque on the virtual object.

In the physical world, two objects will not intersect one another and become intertwined. That is, when two physical objects collide, they may either break, rebound, or deform in shape. They won't, however, as a matter of physical law, simultaneously occupy the same space. Intersection, therefore, is a mathematical concept. However, the extent of an intersection between two virtual objects may be used to simulate the forces that would be experienced by physical world objects. For instance, the extent of intersection between two colliding virtual objects may be related to the forces that resist and/or prevent two physical objects from intersecting in the physical world. Accordingly, the extent of an intersection in the virtual domain may be used to measure the forces that would have arisen in the physical domain to prevent such an intersection.

In one embodiment of the present invention, the depth of penetration is calculated for each primitive of an intersecting virtual object. Since bounding elements only approximate the core representation, the traversal of a bounding volume hierarchy only determines whether an intersection is present, but does not describe the precise location of the intersection or, ultimately, the extent of the intersection. Moreover, bounding elements enclosing both a progenitor and an offset surface will have regions where adjacent bounding elements overlap, creating possible ambiguity as to precisely where an intersecting primitive intersected the surface of the intersected object.

The terms intersecting and intersected object will be used to distinguish two objects being tested for intersection. While either object can be considered as the intersecting or intersected object, when appropriate, the controlled object will be referred to as the intersecting object.

One method of determining the extent of an intersection between virtual objects, referred to as penetration, is to compute the location of each primitive testing positively for intersection during traversal of the bounding volume hierarchy with respect to the surface of the intersected object. However, the closest primitive on the surface of the intersected object to an intersecting primitive may not be known.

Applicants have identified and appreciated that proximity information available in a Voronoi diagram representation of the intersected object may be utilized to rapidly identify the primitive on the surface of the intersected object nearest detected intersection.

Given a set of geometric primitives, a Voronoi diagram is defined as the locus of points having a minimum distance equidistant to at least two primitives and whose distance to all other primitives is greater than said minimum distance. In various fields such as computational geometry, computer graphics, computer vision, etc., the Voronoi diagram may be referred to as the symmetry set, medial axis, Theissen or Dirichlet tessellations, Delaunay triangulation, etc. While these structures may contain other information about a shape or object, they all contain at least the information in a Voronoi diagram as defined above.

Figure 6:
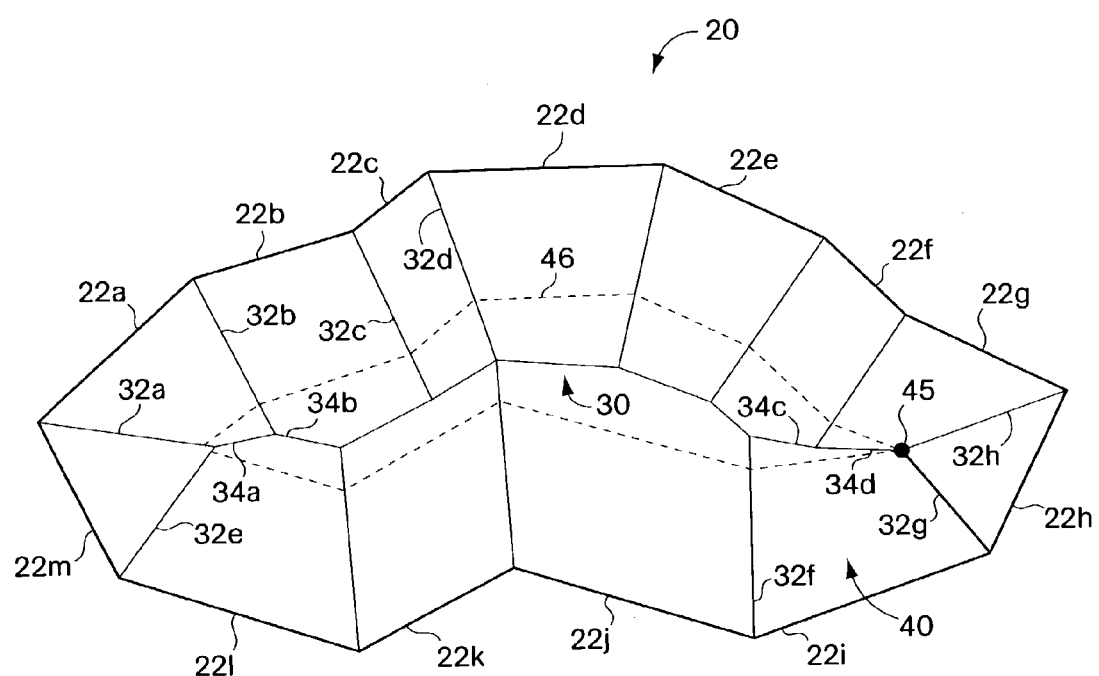
FIG. 6 illustrates an original Voronoi diagram of a virtual object according to one embodiment of the present invention.

FIG. 6 illustrates a two-dimensional closed shape and its associated Voronoi diagram. Shape 20 is formed from a set of connected primitives (e.g., lines) 22a–22m giving rise to Voronoi diagram 30. The Voronoi diagram consists of the primitives on the interior of shape 20. A Voronoi diagram will comprise a set of primitives that depend on the primitives constituting the shape from which the Voronoi diagram is computed. In Voronoi diagram 30, the Voronoi primitives are a set of lines that form the boundaries of a plurality of Voronoi regions. A number of Voronoi primitives are labeled in diagram 30 (e.g., lines 32a–32g). A Voronoi region describes the locus of points having a minimum distance to the same geometric primitive (i.e., all points sharing a closest primitive of the shape or object). For example, every point within Voronoi region 40 is closer to primitive 22i than any other primitive in the set of primitives defining shape 20.

In the two-dimensional case illustrated in FIG. 6, each Voronoi region forms a polygon bounded by at least two original Voronoi primitives of the Voronoi diagram. An original Voronoi primitive refers to a primitive in the Voronoi diagram that includes a point having a globally minimum distance from its at least two equidistant primitives. For example, the Voronoi primitives that arise out of the connections between the lines forming object 20 are original Voronoi primitives. Secondary Voronoi primitives arise from the intersection of two or more original Voronoi primitives and/or the intersection of two or more original and secondary Voronoi primitives.

For clarity, not all of the Voronoi primitives and Voronoi regions are labeled in FIG. 6. Voronoi primitives 32a–32h illustrate several original Voronoi primitives of Voronoi diagram 30. Likewise, Voronoi primitives 34a–34d illustrate several secondary Voronoi primitives. Voronoi region 40, for example, is bounded by original Voronoi primitives 32f and 32g and secondary Voronoi primitives 34c and 34d.

The interactions between Voronoi primitives in the interior of a shape can become quite complex, particularly in three dimensions. As such, the computation of the complete Voronoi diagram may become time consuming and may contain unnecessary information. One method of avoiding the computational overhead involved in computing a complete Voronoi diagram is to calculate an original Voronoi diagram. An original Voronoi diagram refers to a Voronoi diagram wherein only original Voronoi primitives are computed. As such, the myriad of intersections that may occur between original and/or secondary Voronoi primitives in the interior of a shape need not be considered.

In an original Voronoi diagram, a Voronoi region, as defined, is guaranteed to be valid only to a distance defined by the least distance intersection between two original Voronoi primitives. This is because, in an original Voronoi diagram, events that occur beyond this least distance intersection are not computed. The least distance intersection 45 occurs between original Voronoi primitive 32g and 32h. The dotted line 46 in FIG. 6 illustrates the boundary of valid Voronoi regions of the original Voronoi diagram.

As such, the closest primitive on the surface of object 20 can be determined for any point on the interior of object 20 that lies at a depth less than the valid boundary line 46 by comparing the point to the original Voronoi primitives.

It should be appreciated that in the embodiment illustrated in FIG. 6, the original Voronoi primitives are the angle bisectors between adjacent primitives of shape 20. Accordingly, they may be trivially computed. The extension of the Voronoi diagram into three-dimensional space may be easier stated than depicted. In the embodiment in FIG. 6, shape 20 may be, for instance, a three dimensional object represented as a polygonal surface. Accordingly, the Voronoi primitives of the Voronoi diagram for such a representation would be planes rather than lines. As such, the original Voronoi planes are the angle bisectors between adjacent facets of the polygonal surface. In a closed shape, for example, the original Voronoi planes would bisect the angle between polygonal facets sharing an edge. As such, the Voronoi region of a facet in an original Voronoi diagram would be the volume bounded by the Voronoi planes associated with each of the edges of a facet. Therefore, the closest facet of an arbitrary point can be determined by computing which Voronoi region an arbitrary point occupies, that is, by determining if the point is bounded by the original Voronoi planes of the facet of the polygonal surface.

It should be appreciated that the types of primitives used to represent a shape are not limited to lines, polygons, and/or triangles as illustrated in FIG. 6 and discussed above, nor do all of the primitives have to be of the same type. For example, the original Voronoi primitive of a line and a point distinct from the line is a parabola. The original Voronoi primitive arising from the three-dimensional counterpart (i.e., a plane and a point not in the plane) is a paraboloid. A Voronoi diagram may be computed from any combination, arrangement and type of a set of primitives forming the boundary of an object or shape. As such, the Voronoi calculation makes no assumption about the representation and may be computed for arbitrary shapes.

The Voronoi diagram of an object can be used to determine the closest primitive on the surface of an object relative to a point of intersection. Thus, the depth of penetration of an intersecting primitive may be computed by determining the distance between the intersecting primitive and the closest primitive on the surface of the intersected object.

In one embodiment according to the present invention, the depth of penetration is calculated for each primitive of an intersecting object that intersects an intersected object. The depth of penetration refers to a measure related to the distance between a portion of an intersecting object and the surface of the intersected object. For example, a depth of penetration may be the distance from an intersecting primitive to the nearest primitive of the intersected object. Alternatively, the depth of penetration may be the area (2-D) or volume (3-D) of an intersection between an intersecting primitive and the nearest primitive of the intersected object.

Figure 7:
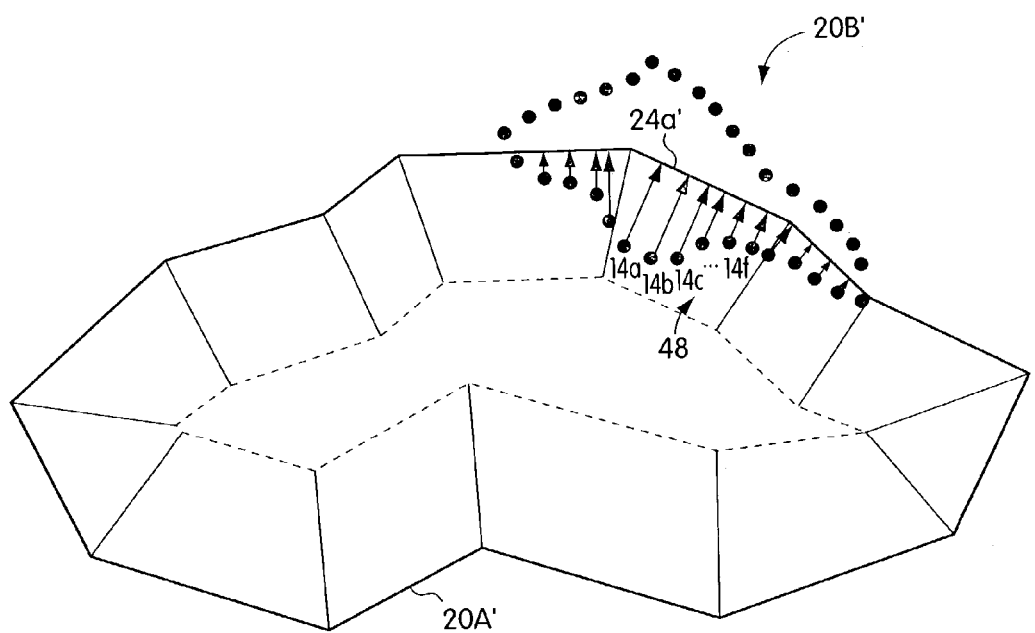
FIG. 7 illustrates a method of determining an extent of an intersection according to one embodiment of the present invention.
Figure 8:
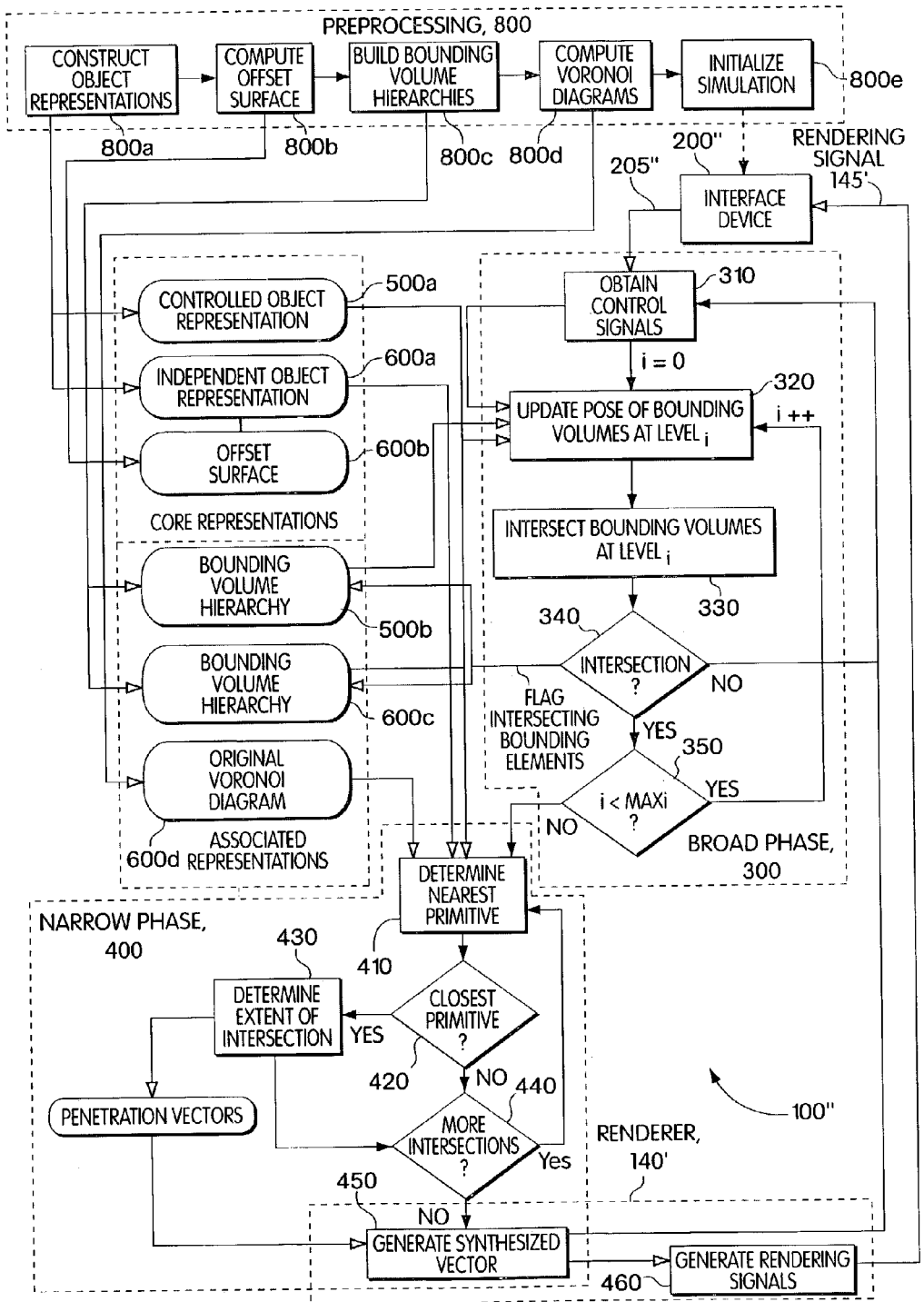
FIG. 8 illustrates a method of collision detection between two virtual objects in a haptic environment according to the present invention.

FIG. 7 illustrates one method of computing full-body contact by determining the extent of an intersection by computing a depth of penetration at each instance of an intersection between two virtual objects. In FIG. 7, the measure of a depth of penetration at each instance is the minimum distance between an intersecting primitive of an intersecting object to the closest primitive on the surface of the intersected object.

In FIG. 7, the core representation of the intersecting object 20B' is a point cloud, and the core representation of the intersected object 20A' is a set of closed connected lines. By some method, for example, by traversing bounding element hierarchies associated with objects 20A' and 20B', it has been determined that a number of primitives of object 20B' lie in the interior of object 20A'. In order to determine which primitive on the surface of object 20A' is nearest each of the intersecting points, the Voronoi region where each intersecting primitive is occupied is computed from the original Voronoi diagram of intersected object 20A'. Points bounded by the Voronoi primitives of a particular facet have that facet as a nearest primitive. For example, points 14a–14f are within Vornoi region 48. As such, each point 14a–14f has primitive 24a' as the nearest primitive from which a depth of penetration may be calculated.

Once the nearest primitive has been determined, the distance from the intersecting point to the nearest primitive may be calculated to determine a depth of penetration of the intersecting point. The distance of the point from the nearest intersected primitive may be determined in any number of ways. The perpendicular distance, for example, may be used as a measure of the depth of penetration.

In the embodiment in FIG. 7, the depth of penetration may be viewed as a penetration vector whose magnitude is the distance between the intersecting primitive and the nearest primitive and whose direction is the direction, for example, along which the distance was calculated. In general, the direction of the penetration vector indicates a direction in which the primitive should move in order to reduce the magnitude of the penetration. On method includes computing the perpendicular distance from the nearest primitive such that the penetration vector has direction indicating a least distance correction of the penetration. In FIG. 7, perpendicular distance vectors have been computed for each of the intersecting points 14a–14f.

The penetration vectors thus calculated describe the extent of the intersection between intersecting object 20B' and intersected object 20A'. It may be desirable to synthesize this set of penetration vectors into a synthesized vector. For example, in the case of a haptic feedback system, it may be desirable to report the results of intersection back to a user such that the full-body contact between the two objects is rendered. Moreover, it may be important for the simulation to update the pose of the objects based on a synthesized vector. That is, since intersection is a concept in the virtual domain, in order to effectively simulate the physical domain, an intersection may need to be corrected and/or eliminated. The synthesized vector may be used to indicate the direction the intersecting object will need to move in order to correct the penetration.

One method of computing a synthesized vector from a set of penetration vectors is to take the weighted sum of the penetration vectors. An alternative method of determining the extent of intersection is to model the intersection as an impulse. This concept suggests that the furthest extent of an intersection should guide the correction. Accordingly, one method of determining a synthesized vector is to base the synthesized vector on the penetration vector having the greatest magnitude. Other methods of determining a synthesized vector will occur to those skilled in the art and are considered to be within the scope of the invention.

In a simulation that provides haptic rendering, it may be desirable to determine a location of application for a synthesized or force vector computed during interaction in order to describe the contact between two virtual objects. A location of application refers to a location in space where a vector is to be applied. Typically the location of application is in reference to a virtual object, the controlled portion of a haptic interface device, or both. For instance, if full-body contact is to be accurately rendered, a location of application for a force vector included in rendering signals provided to a haptic interface device may be desirable, particularly haptic interface devices operating with more than three degrees of freedom.

For example, a force vector applied to the center of mass of a controlled portion of a haptic interface device will feel different to a user than the same force vector applied off the center of mass in that the latter tends to cause the controlled portion of the haptic interface device to rotate. As such, the location of application may be important in articulating particular sensations such as torque.

The location of application may be determined in a number of ways. One method includes taking the centroid of the region of intersection between the two objects. A weighted sum of the locations of each of the intersecting primitives may be computed in order to determine a location of application. Alternatively, the location of application may be related to the location of an intersecting primitive giving rise to a penetration vector having the greatest magnitude. Other methods of determining a location of application will occur to those skilled in the art and are considered to be within the scope of the invention.

A synthesized vector may incorporate the rotational force on a virtual object by storing components related to the torque or moment of a virtual object. A moment may be calculated from the penetration vectors and incorporated into the synthesized vector. As such, a synthesized vector may include three components related to the translational force on a virtual object and three components related to the rotational force on a virtual object. The moment may be calculated, for instance, in relation to the center of mass of the virtual object or in relation to the center of mass of the controlled portion of a haptic interface device.

A synthesized vector may be used as a measure as to how the objects would have behaved in the physical domain. As such, the synthesized vector may be used to compute a new pose of the virtual objects. In addition, objects may deform upon collision. As such, the set of penetration vectors may be used to deform or modify the representations of one or both of the colliding objects.

For example, in the milling application, the penetration vectors may describe the portion of the milling surface that is removed by the tool according to such a contact. The synthesized vector and a location of application may be used to determine a rebound or reflection force. The characteristics of the virtual objects, that is, the characteristics of the physical objects being simulated may guide the way in which the penetration vectors and/or the synthesized vector is utilized and how the penetration vectors are synthesized.

FIG. 7 illustrates one embodiment according to the present invention including a method of providing three dimensional real-time collision detection, full-body contact of arbitrary shapes with six degrees of freedom in a simulation associated with a haptic interface device. In this embodiment the intersection of two virtual objects is considered. It should be appreciated that the method of collision detection described below may be repeated for any number of objects in an environment for which it is desired to determine an intersection.

The first object is controlled by a user manipulating interface device 200". Interface device 200" is capable of tracking the movements of the user with six degrees of freedom and provides control signals 205" having information related to movement in each of the six dimensions over which the device is free to vary. In the following description, the first object will be referred to interchangeably as the controlled object and the intersecting object. The second object will be referred to as the independent or intersected object. An independent object is a virtual object that is not directly controlled by a user via an interface device. It should be appreciated that an independent object may be indirectly controlled by user, for example, by manipulating the controlled object such that a collision or contact occurs with the independent object. However, an independent object typically will not be updated according to control signals from the interface device, but rather as a result of interaction computations.

Before simulation begins a model of the environment in generated in preprocessing stage 800. The various representations of the virtual objects are generated during preprocessing stage 800. In the embodiment in FIG. 7, controlled object 500 and independent object 600 have triangulated surface representations. As such, the surface representation comprises a set of primitives, namely triangles.

There are numerous ways to store the triangles of a triangulated surface. For example, the triangles may be stored as the vertices of the triangles. The vertex representation may include information about edges, adjacent triangles etc. It should be appreciated that by storing the vertices (i.e., three dimensional points) of the triangulated surface, a point cloud representation is necessarily implied. That is, a triangulated surface can be thought of as including a point cloud representation with additional information, for example, the connectedness of points, adjacency information, etc. As such, controlled object 500 and independent object 600 also have point cloud core representations.

In step 800a, the object representations are generated and stored, for example, in a computer readable medium such as a memory. Object representations are often stored in data abstractions or structures defined by the simulation designer. Data abstractions include, but are not limited to, Java classes, C structs, C++classes, etc. Any method of generating, storing and providing access to the mathematical and/or geometric description of an object is suitable and contemplated for simulations according to the present invention.

In step 800b, an offset surface of the representation of independent object 600 is computed. As such, the independent object has a progenitor triangulated surface 600a representation and an offset triangulated surface representation 600b.

In step 800c, bounding volume hierarchies are computed and stored for the objects in the virtual environment. For example, 24-DOPS may be used to provide a progressively refined boundary volume hierarchy of the virtual objects. In the embodiment if FIG. 7, the root level of each bounding volume hierarchy is a superset of the entire core representation. At the leaf level, the bounding element (e.g., a 24-DOP) encloses a single primitive of the core representation. As such, bounding volume hierarchies 500b and 600c are generated for the controlled object and independent object, respectively.

The bounding volume hierarchy 600c of the independent object is constructed to enclose the progenitor surface 600a and the offset surface 600b. As such, the leaf level bounding elements enclose both a primitive (e.g., a triangular facet) on the progenitor surface and the associated primitive on the offset surface. As such, the bounding elements at the leaf level incorporate depth information about the interior of the independent object.

In step 800d, an original Voronoi diagram 600d is calculated for the triangulated surface representation of independent object 600. In this embodiment, an original Voronoi diagram of the intersected object is computed. However, in embodiments where a virtual object may be considered, at times, as the intersecting object and/or the intersected object, the Voronoi diagram may need to be computed for each virtual object for which an intersection will be tested.

Preprocessing stage 80 may include other computational tasks or initialization procedures required to begin a simulation. For example, the simulation may need to check for and validate a correct communication with interface device 200", synchronize the haptic interface device and one or more rendering modes, etc. It should be appreciated that the preprocessing phase 800 is outside of the force feedback loop. After the initialization is completed, the feedback control loop is activated and the simulation begins. In the simulation described in FIG. 7, the interaction is divided into two phases; a broad phase 300 and a narrow phase 400.

A user may begin participating in the virtual environment by manipulating the interface device 200". Interface device 200" may be any interface device capable of translating a user's translational and rotational objectives into control signals and providing them to the simulation. In the embodiment illustrated in FIG. 7, interface device 200" provides control signals 205" including information related to translation affected by the user in three dimensions and rotations affected by the user in three dimensions. For instance, interface device may indicate the change in pose of the interface device enacted by the user since the last update of control signals 205". Alternatively, interface device 200" may provide an absolute pose of interface device 200" at the instant of issue of control signals 205". The control signals are then provided to the simulation such that the simulation can be updated accordingly.

In response to receiving control signals 205" from interface device 200", the simulation may update the pose of controlled object 500. For example, simulation 100" may effect a transformation on the core representation of controlled object 500 to simulate the movement of the virtual object according to control signals 205". However, controlled object 500 may be complex and consist of a large number of primitives. As such, transforming each of the primitives of the core representation each time control signals are issued from the interface device may compromise real-time constraints.

In the embodiment in FIG. 7, updating the controlled object according to the control signals may be completed recursively and involving the various representations of the controlled object only at a necessary resolution. For example, updating the pose of the controlled object may be part of, and may be terminated or completed, along with the traversal of the bounding volume hierarchies 500b and 600c. As such, the updating of a controlled object may be accomplished with the same efficiency as the intersection of the object by only requiring portions of an object representation to be transformed as needed, for instance, by transforming only child bounding volumes of intersecting bounding volumes and ignoring children of non-intersecting bounding volumes.

In step 310, control signals 205" are obtained from the interface device 200" and the broad phase loop of intersecting the controlled object (i.e., the intersecting object) and the independent object (i.e., the intersected object) begins. The broad phase includes traversing the bounding volume hierarchies of the controlled and independent objects. As noted above, updating the controlled object is accomplished as an iterative process during the traversal of the bounding volume hierarchies.

As such, in step 320 of the broad phase, the core level bounding element of hierarchy 500a (i.e., the bounding element that encloses the entire representation of the controlled object) is updated according to control signals 205". It should be appreciated that a transformed root level bounding element encloses the controlled object as if the controlled object had been transformed itself. Such is the case at every level of the bounding volume hierarchy.

The root level of the bounding volume hierarchies are then intersected. As shown in FIG. 7, the root level is considered $level_0$. In step 330, each bounding element at $level_i$ is tested for an intersection. As discussed above, if no intersection occurs between the two root level bounding volumes, no intersection has occurred between the core representation of the controlled object and the independent object. Likewise, at any $level_i$ of the bounding volume hierarchy, if no bounding volumes intersect, no intersection between the controlled object and the independent object occurs.

At each iteration, only the child bounding volumes of intersecting bounding volumes are transformed. As such, in steps 320, 330, and 340, the bounding volumes at $level_i$ of hierarchy 500b having intersecting parent bounding volumes are updated according to control signals 205' and then intersected with the bounding volumes at $level_i$ of hierarchy 600c having intersecting parent bounding volumes. The bounding volumes that are determined as intersecting are flagged and only children of these intersecting bounding volumes are tested for intersection during the next iteration at $level_{i+1}$. Non-intersecting bounding volumes and their children are not considered during subsequent iterations either for update or intersection. If no intersection is detected at levels, the traversal is terminated and the simulation provides this information to the user. For example, in a haptic rendering, the simulation may provide zero level rendering signals 145' to the interface device 200" to indicate that no collision has occurred and no forces should be articulated to the user.

At each iteration, it is determined if the leaf level of the hierarchy has been intersected as shown in step 350. If the leaf level has not been intersected, i is incremented and the procedure is repeated from step 320. If the leaf level of the hierarchy has been intersected and at least one leaf level bounding volume of hierarchies 500b and 600c intersect, the core representations of the controlled object and the independent object may intersect and the simulation enters a narrow phase 400.

In the embodiment in FIG. 7, the leaf level bounding volumes enclose a single primitive on the controlled object and a single primitive of the progenitor surface and the associated primitive of the offset surface of the independent object. As such, each leaf level bounding volume of hierarchy 500b that has tested positive for intersection with at least one leaf level bounding volume of hierarchy 600c will enclose a primitive of the core representation of the controlled object that may need to be considered during the narrow phase 400 in order to accurately compute the extent of intersection or penetration of the controlled object into the independent object.

Narrow phase 400 includes identifying for each intersecting primitive in the representation of the controlled object the nearest primitive of the representation of the independent object. Once the nearest primitive has been identified, a distance from the intersecting primitive is determined and a penetration vector is computed for that intersection. After a penetration vector has been computed for each intersecting primitive, a synthesized vector may be generated from the penetration vectors. This synthesized vector may be indicative of a force that will reduce or eliminate the intersection between the controlled and the independent object.

In step 410, an intersecting primitive is taken from the set of intersecting primitives that resulted from the broad phase. The nearest primitive of the representation of the independent object is determined by using the proximity information of the original Voronoi diagram computed from the surface of the independent object. As noted, the original Voronoi primitives of a triangulated surface in three dimensions are a set of planes. As such, each facet of the triangulated surface representing independent object 600 has an associated Voronoi plane for each of its three edges. The original Voronoi planes associated with a particular facet bound the region of the interior of the independent object containing all points nearer to the particular facet than any other facet in the triangulated surface, that is, they bound the associated Voronoi region.

Therefore, it can be determined if a primitive of the independent object (intersected primitive) is nearest to an intersecting primitive of the controlled object by comparing the intersecting primitive to the Voronoi planes associated with the intersected primitive. If the intersecting primitive is found to lie in the region bounded by the Voronoi planes, it is nearer the associated intersected primitive than any other primitive of the triangulated surface of the independent object.

Before determining the nearest primitive, the selected intersecting primitive is first transformed according to control signals 205". It should be appreciated that only the intersecting primitives need to be updated and not the entire core representation. The intersecting primitive is then compared to the Voronoi planes of the intersected primitive in step 410. In step 420, it is determined if the intersecting primitive is within the Voronoi region of the intersected facet. If the primitive is determined to be in the Voronoi region bounded by the Voronoi planes, the penetration of the primitive is then calculated and a penetration vector associated with that intersection is computed in step 430. If the selected primitive is found to lie outside of the Voronoi region, the next intersecting primitive is selected from the set of intersecting primitives that resulted from the broad phase and the procedure is repeated at step 410 until all intersecting primitives have been processed.

The penetration vector of an intersection may be computed in a number of ways. For example, the core representation of the controlled object includes a point cloud. As such, the intersecting primitives are in fact points. According to one embodiment, the perpendicular distance between the intersecting point and the nearest facet may be calculated in order to generate a penetration vector indicating the magnitude of the penetration, and a direction of least distance to the surface of the intersected object.

When all of the intersecting primitives are processed and penetration vectors computed for each of the valid intersections, a synthesized vector may be computed from the penetration vectors. The synthesized vector may be generated in a number of ways. For example, a weighted sum of the penetration vectors may be computed in order to generate the synthesized vector. Additionally, the synthesized vector may be computed based on the penetration vector having the greatest magnitude. Various alternative methods for synthesizing a vector from the penetration vectors will occur to those skilled in the art and are within the scope of the present invention.

The synthesized vector and a location of application are then is then incorporated into rendering signals 145" as a force feedback applied to interface device 200" to indicate the controlled object is in contact with the independent object and to articulate to the user the conditions of the contact and the forces arising from such a spatial relationship.

It should be appreciated that visual rendering signals may also be generated from the force-feedback vector. For instance, the representations of the controlled object and the independent object may be transformed to simulate the effects that such a force would have on the virtual objects. For example, in the milling application, the representation of the independent object may be updated to indicate the material from the independent object removed by the contact of the milling tool (i.e., the controlled object).

Typically, a user will respond to the feed-back received via the rendering signals by further manipulation of the controlled object. As such, the feedback control loop continues as described until the simulation ends, the user ceases to respond or otherwise indicates that the simulation has been terminated.

Having described several embodiments of the invention in detail, various modifications and improvements will readily occur to those skilled in the art. Such modifications and improvements are intended to be within the scope of the invention. Accordingly, the foregoing description is by way of example only, and is not intended as limiting. The invention is limited only as defined by the following claims and the equivalents thereto.

What is claimed is:

1. A method of determining a depth of penetration of a first object and a second object, the method comprising acts of:

constructing a first representation of the first object including a first set of primitives having a first core representation, the first set of primitives including a first bounding volume hierarchy associated with the first core representation, and constructing a second representation of the second object including a second set of primitives having a second core representation, the second set of primitives including a second bounding volume hierarchy associated with the second core representation, the second representation defining at least a surface of the second object;

determining at least an original Voronoi diagram of the second representation;

detecting at least one intersection between the first representation and the second representation, wherein the act of detecting the at least one intersection includes an act of determining whether each primitive of the first core representation is an intersecting primitive of the second core representation by traversing the first and second bounding volume hierarchies; and determining a distance from the at least one point of intersection to the surface of the second object based on a location of the at least one point of intersection within the original Voronoi diagram, including determining a penetration direction from the at least one intersection to the surface of the second object.

2. The method of claim 1, further comprising an act of identifying for each intersecting primitive a nearest primitive of the second core representation by determining where the intersecting primitive lies with the original Voronoi diagram.

3. The method of claim 2, wherein the act of determining the original Voronoi diagram includes an act of computing at least the original Voronoi diagram of the second core representation and wherein the act identifying the nearest primitive includes an act of verifying whether each intersecting primitive lies within the Voronoi region associated with a primitive of the second core representation.

4. The method of claim 3, further comprising an act of computing for each intersecting point at least one penetration vector having a magnitude related to the distance between the intersecting point and the nearest facet and a direction that tends to reduce the magnitude.

5. The method of claim 4, further comprising an act of computing at least one synthesized vector from the at least one penetration vector, the at least one synthesize vector including at least one translational force component and at least one rotational force component.

6. The method of claim 5, wherein the synthesized vector includes three translational force components and three rotational force components.

7. The method of claim 3, wherein the first core representation includes a point cloud and the second core representation is a polygonal surface.

8. The method of claim 7, further comprising identifying a nearest facet of the polygonal surface to each intersecting point of the point cloud by determining which Voronoi region of the original Voronoi diagram the intersecting point is occupied.

9. The method of claim 8, further comprising an act of computing for each intersecting point a penetration vector having a magnitude related to the distance between the intersecting point and the nearest facet and a direction that tends to reduce the magnitude.

10. A method of determining a depth of penetration of a first object and a second object, the method comprising acts of:

constructing a first representation of the first object including a first set of primitives having a first core representation, and constructing a second representation of the second object including a second set of primitives having a second core representation that includes a progenitor surface and an offset surface, the second representation defining at least a surface of the second object;

determining at least an original Voronoi diagram of the second representation;

detecting at least one intersection between the first representation and the second representation; and determining a distance from the at least one point of intersection to the surface of the second object based on a location of the at least one point of intersection within the original Voronoi diagram, including determining a penetration direction from the at least one intersection to the surface of the second object.

11. In a virtual environment including a haptic interface device having a controlled portion moveable with six degrees of freedom, a method of simulating an interaction between a controlled object and an independent object with six degrees of freedom, the method comprising acts of:

receiving control signals from the interface device, the control signals including pose information with six degrees of freedom;

updating a first representation of the controlled object with the six degrees of freedom of the pose information;

determining a presence or an absence of intersection between the first representation of the controlled object and a second representation of the independent object; and computing at least one haptic rendering signal related to the presence or absence of intersection between the first representation and the second representation, wherein the at least one rendering signal includes at least one force vector and a location of application of the at least one force vector.

12. The method of claim 11, wherein the at least one rendering signal includes at least one vector having at least one translational force component and at least one rotational force component.

13. The method of claim 11, wherein the first representation includes a first set of primitives and the second representation includes a second set of primitives.

14. The method of claim 13, wherein the act of determining a presence or an absence of intersection includes determining whether each primitive of the first set of primitives is an intersecting primitive of the second representation.

15. The method of claim 14, further comprising an act of computing at least one penetration vector for each intersecting primitive having a magnitude related to a distance between the intersecting primitive and a nearest primitive of the second set of primitives and a direction that tends to reduce the magnitude.

16. The method of claim 15, wherein at least one synthesized vector is generated from the at least one penetration vector based on at least one of a weighted sum of the penetration vectors and a penetration vector of the at least one penetration vector having the greatest magnitude.

17. The method of claim 16, further comprising an act of computing a location of application on the first object to apply the synthesized vector.

18. The method of claim 17, wherein the at least one rendering signal includes the synthesized vector and the location of application.

19. The method of claim 15, wherein the at least one rendering signal includes at least one force vector synthesized from the at least one penetration vector.

20. The method of claim 19, wherein the at least one rendering signal includes at least one synthesized vector including at least one translational force component and at least one rotational force component.

21. The method of claim 20, wherein the synthesized vector includes three translational force components and three rotational force components.

22. A method of providing full-body contact between a first object and a second object, the method including acts of:

representing a first object by a first representation including a first set of primitives and a second object by a second representation including a second set of primitives;

detecting a presence or an absence of an intersection between each of the first set of primitives and the second set of primitives;

determining at least one penetration vector for each present intersection;

computing at least one synthesized vector from the at least one penetration vector, the at least one synthesized vector having at least one translational force component and at least one rotational force component; and computing a location of application on the first object to apply the at least one synthesized vector based on locations of each of the present intersections.

23. A method of providing full-body contact between a first object and a second object, the method including acts of:

representing a first object by a first representation including a first set of primitives and a second object by a second representation including a second set of primitives;

detecting a presence or an absence of an intersection between each of the first set of primitives and the second set of primitives;

determining at least one penetration vector for each present intersection;

computing at least one synthesized vector from the at least one penetration vector, the at least one synthesized vector having at least one translational force component and at least one rotational force component, wherein the at least one synthesized vector includes three translational force components and three rotational force components; and computing a location of application on the first object to apply the at least one synthesized vector based on locations of each of the present intersections.

24. A method of providing full-body contact between a first object and a second object, the method including acts of:

representing a first object by a first representation including a first set of primitives to form a first core representation having an associated first bounding volume hierarchy, and representing a second object by a second representation including a second set of primitives to form a second core representation having an associated second bounding volume hierarchy;

detecting a presence or an absence of an intersection between each of the first set of primitives and the second set of primitives;

determining at least one penetration vector for each present intersection;

computing at least one synthesized vector from the at least one penetration vector, the at least one synthesized vector having at least one translational force component and at least one rotational force component; and computing a location of application on the first object to apply the at least one synthesized vector based on locations of each of the present intersections.

25. The method of claim 24, wherein the act of determining a presence or an absence of an intersection includes an act of determining whether each primitive of the first core representation is an intersecting primitive of the secondcore representation by traversing the first and second bounding volume hierarchies.

26. The method of claim 25, further comprising an act of determining for each intersecting primitive a nearest primitive of the second core representation.

27. The method of claim 26, further comprising an act of computing at least an original Voronoi diagram of the second core representation.

28. The method of claim 27, wherein the act of determining the nearest primitive includes determining for each intersecting primitive a nearest primitive of the second representation by determining a location of each intersecting primitive within the original Voronoi diagram.

29. The method of claim 26, wherein each penetration vector of the at least one penetration vector is computed having a magnitude related to the distance between the intersecting primitive and the nearest primitive and a direction that tends to reduce the magnitude.

30. The method of claim 29, wherein the act of synthesizing the at least one force vector includes an act of computing at least one of a weighted average of the penetration vectors and a maximum magnitude penetration vector of the at least one penetration vector.

31. The method of the claim 30, wherein the act of computing a location of application includes computing a location of application based on a weighted average of locations of the intersecting primitives.

32. A computer readable medium encoded with a program for execution on at least one processor, the program, when executed on the at least one processor, performs a method for determining an extent of an intersection between a first object and a second object, the method comprising acts of:
constructing a first representation of the first object including a first set of primitives having a first core representation, the first set of primitives including a first bounding volume hierarchy associated with the first core representation, and constructing a second representation of the second object including a second set of primitives having a second core representation, the second set of primitives including a second bounding volume hierarchy associated with the second core representation, the second representation defining at least a surface of the second object;
determining at least an original Voronoi diagram of the second representation;
detecting at least one intersection between the first representation and the second representation, wherein the act of detecting the at least one intersection includes an act of determining whether each primitive of the first core representation is an intersecting primitive of the second core representation by traversing the first and second bounding volume hierarchies;
determining a distance from the at least one point of intersection to the surface of the second object based on a location of the at least one point of intersection within the original Voronoi diagram.

33. The computer readable medium of claim 32, further comprising an act of identifying for each intersecting primitive a nearest primitive of the second core representation by determining where the intersecting primitive lies with the original Voronoi diagram.

34. The computer readable medium of claim 33, wherein the act of determining the original Voronoi diagram includes an act of computing at least the original Voronoi diagram of the second core representation and wherein the act identifying the nearest primitive includes an act of verifying whether each intersecting primitive lies within the Voronoi region associated with a primitive of the second core representation.

35. The computer readable medium of claim 34, further comprising an act of computing for each intersecting point at least one penetration vector having a magnitude related to the distance between the intersecting point and the nearest facet and a direction that tends to reduce the magnitude.

36. The computer readable medium of claim 35, further comprising an act of computing at least one synthesized vector from the at least one penetration vector, the at least one synthesize vector including at least one translational force component and at least one rotational force component.

37. The computer readable medium of claim 36, wherein the synthesized vector includes three translational force components and three rotational force components.

38. The computer readable medium of claim 34, wherein the first core representation includes a point cloud and the second core representation is a polygonal surface.

39. The computer readable medium of claim 38, further comprising identifying a nearest facet of the polygonal surface to each intersecting point of the point cloud by determining which Voronoi region of the original Voronoi diagram the intersecting point is occupied.

40. The computer readable medium of claim 39, further comprising an act of computing for each intersecting point a penetration vector having a magnitude related to the distance between the intersecting point and the nearest facet and a direction that tends to reduce the magnitude.

41. A computer readable medium encoded with a program for execution on at least one processor, the program, when executed on the at least one processor, performs a method for determining an extent of an intersection between a first object and a second object, the method comprising acts of:
constructing a first representation of the first object including a first set of primitives having a first core representation, and constructing a second representation of the second object including a second set of primitives having a second core representation that includes a progenitor surface and an offset surface, the second representation defining at least a surface of the second object;
determining at least an original Voronoi diagram of the second representation;
detecting at least one intersection between the first representation and the second representation; and
determining a distance from the at least one point of intersection to the surface of the second object based on a location of the at least one point of intersection within the original Voronoi diagram.

42. An interface device in combination with a computer readable medium encoded with a program for execution on at least one processor, the program, when executed on the at least one processor, performs a method for determining an extent of an intersection between a first object and a second object, the method comprising acts of:
constructing a first representation of the first object and a second representation of the second object, the second representation defining at least a surface of the second object;
determining at least an original Voronoi diagram of the second representation;

detecting at least one intersection between the first representation and the second representation;

determining a distance from the at least one point of intersection to the surface of the second object based on a location of the at least one point of intersection within the original Voronoi diagram, wherein the interface device is capable of providing control signals related to a pose of the interface device.

43. The combination of claim 42, further comprising an act of receiving the control signals from the interface device and updating a pose of the first object according to the control signals.

44. The combination of claim 43, wherein the interface device has a moveable portion capable of variation over six degrees of freedom and wherein the control signals contain a component related to variation of the moveable portion in each of the six degrees of freedom.

45. The combination of claim 44, further comprising an act of providing haptic rendering signals to the haptic interface device.

46. The combination of claim 45, further comprising an act of computing at least one penetration vector from the at least one intersection, the at least one penetration vector having a magnitude related to the distance to the surface of the second object of the at least one intersection and a direction that tends to reduce the magnitude.

47. The combination of claim 46, wherein the haptic rendering signals are computed based on the at least one penetration vector.

48. The combination of claim 47, wherein the haptic rendering signals include at least one force vector synthesized from the at least one penetration vector and a location of application for the at least one force vector, the location of application related to at least one of a location on the first object and a location on the moveable portion of the haptic interface device.

49. The combination of claim 44, wherein the interface device is a haptic interface device.

50. A computer readable medium encoded with a program for execution on at least one processor, the program, when executed on the at least one processor, performing, in a virtual environment including a haptic interface device having a controlled portion moveable with six degrees of freedom, a method of simulating an interaction between a controlled object and an independent object with six degrees of freedom, the method comprising acts of:

receiving control signals from the interface device, the control signals including pose information with six degrees of freedom;

updating a first representation of the controlled object with the six degrees of freedom of the pose information;

determining a presence or an absence of intersection between the first representation of the controlled object and a second representation of the independent object;

computing at least one rendering signal related to the presence or absence of intersection between the first representation and the second representation.

51. The computer readable medium of claim 50 in combination with the haptic interface device.

52. The combination of claim 51, wherein the at least one rendering signal is applied to the controlled portion of the haptic interface device.

53. The combination of claim 52, wherein the at least one rendering signal includes at least one force vector and a location of application of the force vector.

54. The combination of claim 53, wherein the at least one force vector is applied to the controlled portion of the haptic interface device at a location on the controlled portion according to the location of application.

55. A computer readable medium encoded with a program for execution on at least one processor, the program, when executed on the at least one processor, performing, in a virtual environment including a haptic interface device having a controlled portion moveable with six degrees of freedom, a method of simulating an interaction between a controlled object and an independent object with six degrees of freedom, the method comprising acts of:

receiving control signals from the interface device, the control signals including pose information with six degrees of freedom;

updating a first representation of the controlled object with the six degrees of freedom of the pose information;

determining a presence or an absence of intersection between the first representation of the controlled object and a second representation of the independent object;

computing at least one rendering signal related to the presence or absence of intersection between the first representation and the second representation, wherein the at least one rendering signal includes at least one force vector and a location of application of the at least one force vector.

56. A computer readable medium encoded with a program for execution on at least one processor, the program, when executed on the at least one processor, performing, in a virtual environment including a haptic interface device having a controlled portion moveable with six degrees of freedom, a method of simulating an interaction between a controlled object and an independent object with six degrees of freedom, the method comprising acts of:

receiving control signals from the interface device, the control signals including pose information with six degrees of freedom;

updating a first representation of the controlled object with the six degrees of freedom of the pose information;

determining a presence or an absence of intersection between the first representation of the controlled object and a second representation of the independent object;

computing at least one rendering signal related to the presence or absence of intersection between the first representation and the second representation, wherein the at least one rendering signal includes at least one force vector including at least one translational force component and at least one rotational force component.

57. A computer readable medium encoded with a program for execution on at least one processor, the program, when executed on the at least one processor, performing, in a virtual environment including a haptic interface device having a controlled portion moveable with six degrees of freedom, a method of simulating an interaction between a controlled object and an independent object with six degrees of freedom, the method comprising acts of:

receiving control signals from the interface device, the control signals including pose information with six degrees of freedom;

updating a first representation including a first set of primitives of the controlled object with the six degrees of freedom of the pose information;

determining a presence or an absence of intersection between the first representation of the controlled object and a second representation of the independent object, the second representation including a second set of primitives;

computing at least one rendering signal related to the presence or absence of intersection between the first representation and the second representation.

58. The computer readable medium of claim 57, wherein the act of determining a presence or an absence of intersection includes determining whether each primitive of the first set of primitives is an intersecting primitive of the second representation.

59. The computer readable medium of claim 58, further comprising an act of computing at least one penetration vector for each intersecting primitive having a magnitude related to a distance between the intersecting primitive a nearest primitive of the second set of primitives and a direction that tends to reduce the magnitude.

60. The computer readable medium of claim 59, wherein at least one synthesized vector is generated from the at least one penetration vector based on at least one of a weighted sum of the penetration vectors and a penetration vector of the at least one penetration vector having the greatest magnitude.

61. The computer readable medium of claim 60, further comprising an act of computing a location of application on the first object to apply the synthesized vector.

62. The computer readable medium of claim 61, wherein the at least one rendering signal includes the synthesized vector and the location of application.

63. The computer readable medium of claim 59, wherein the at least one rendering signal includes at least one force vector synthesized from the at least one penetration vector.

64. The computer readable medium of claim 63, wherein the at least one rendering signal includes at least one synthesized vector including at least one translational force component and at least one rotational force component.

65. A computer readable medium encoded with a program for execution on at least one processor, the program, when executed on the at least one processor, performing a method of providing full-body contact between a first object and a second object, the method comprising acts of:

representing a first object by a first representation including a first set of primitives and a second object by a second representation including a second set of primitives;

detecting a presence or an absence of an intersection between each of the first set of primitives and the second set of primitives;

determining at least one penetration vector for each present intersection;

computing at least one synthesized vector from the at least one penetration vector, the at least one synthesized vector having at least one translational force component and at least one rotational force component; and computing a location of application on the first object to apply the at least one synthesized vector based on locations of each of the present intersections.

66. The computer readable medium of claim 65 in combination with a haptic interface device.

67. The combination of claim 66, further comprising an act of providing rendering signals to the haptic interface device including the at least one force vector and the location of application.

68. The combination of claim 67, wherein the haptic interface device includes a controlled portion capable of movement with six degrees of freedom and the interface device provides control signals having components in each of the six dimensions over which the controlled portion is free to vary.

69. The combination of claim 68, further comprising an act of the receiving the control signals from the haptic interface device and updating a pose of the representation of the first object according to the control signals.

70. A computer readable medium encoded with a program for execution on at least one processor, the program, when executed on the at least one processor, performing a method of providing full-body contact between a first object and a second object, the method comprising acts of:

representing a first object by a first representation including a first set of primitives to form a first core representation having an associated first bounding volume hierarchy, and representing a second object by a second representation including a second set of primitives to form a second core representation having an associated second bounding volume hierarchy;

detecting a presence or an absence of an intersection between each of the first set of primitives and the second set of primitives;

determining at least one penetration vector for each present intersection;

computing at least one synthesized vector from the at least one penetration vector, the at least one synthesized vector having at least one translational force component and at least one rotational force component; and computing a location of application on the first object to apply the at least one synthesized vector based on locations of each of the present intersections.

71. The computer readable medium of claim 70, wherein the act of determining a presence or an absence of an intersection includes an act of determining whether each primitive of the first core representation is an intersecting primitive of the second core representation by traversing the first and second bounding volume hierarchies.

72. The computer readable medium of claim 71, further comprising an act of determining for each intersecting primitive a nearest primitive of the second core representation.

73. The computer readable medium of claim 72, further comprising an act of computing at least an original Voronoi diagram of the second core representation.

74. The computer readable medium of claim 73, wherein the act of determining the nearest primitive includes determining for each intersecting primitive a nearest primitive of the second representation by determining a location of each intersecting primitive within the original Voronoi diagram.

75. The computer readable medium of claim 72, wherein each penetration vector of the at least one penetration vector is computed having a magnitude related to the distance between the intersecting primitive and the nearest primitive and a direction that tends to reduce the magnitude.

76. The computer readable medium of claim 75, wherein the act of synthesizing the at least one force vector includes an act of computing at least one of a weighted average of the penetration vectors and a maximum magnitude penetration vector of the at least one penetration vector.

77. The computer readable medium of the claim 76, wherein the act of computing a location of application includes computing a location of application based on a weighted average of locations of the intersecting primitives.

* * * * *

UNITED STATES PATENT AND TRADEMARK OFFICE
CERTIFICATE OF CORRECTION

PATENT NO. : 7,084,869 B2 Page 1 of 1
APPLICATION NO. : 10/267907
DATED : August 1, 2006
INVENTOR(S) : Sriram et al.

It is certified that error appears in the above-identified patent and that said Letters Patent is hereby corrected as shown below:

In the Specification:

Column 12, line 23, please replace "nonintersecting" with -- non-intersecting --.

The Claims:

Col. 27, Line 4 claim 25, line 4, please replace "of the secondcore" with -- of the second core --.

Signed and Sealed this

Thirteenth Day of March, 2007

JON W. DUDAS
*Director of the United States Patent and Trademark Office*